(12) United States Patent
Ringseth et al.

(10) Patent No.: US 7,730,447 B2
(45) Date of Patent: *Jun. 1, 2010

(54) SYSTEM AND METHODS FOR PROVIDING A DECLARATIVE SYNTAX FOR SPECIFYING SOAP-BASED WEB SERVICES

(75) Inventors: Paul F. Ringseth, Redmond, WA (US); Momin M. Al-Ghosien, Sammamish, WA (US); Jasjit S. Grewal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1305 days.

This patent is subject to a terminal disclaimer.

(21) Appl. No.: 11/198,518

(22) Filed: Aug. 5, 2005

(65) Prior Publication Data

US 2006/0004777 A1    Jan. 5, 2006

Related U.S. Application Data

(63) Continuation of application No. 09/902,818, filed on Jul. 10, 2001, now Pat. No. 7,055,143.

(51) Int. Cl.
    *G06F 9/44*    (2006.01)
(52) U.S. Cl. ..................................... 717/106
(58) Field of Classification Search .................. 717/106
    See application file for complete search history.

(56) References Cited

U.S. PATENT DOCUMENTS

| 5,142,681 | A | 8/1992 | Driscoll et al. .............. 395/700 |
|---|---|---|---|
| 5,713,032 | A | 1/1998 | Spencer ....................... 395/777 |
| 5,898,872 | A | 4/1999 | Richley ....................... 395/703 |
| 5,999,740 | A | 12/1999 | Rowley ........................ 395/712 |
| 6,021,275 | A | 2/2000 | Horwat ........................ 395/707 |
| 6,083,276 | A | 7/2000 | Davidson et al. ............... 717/1 |
| 6,378,126 | B2 | 4/2002 | Tang ............................. 717/5 |
| 6,654,953 | B1 | 11/2003 | Beaumont et al. ........... 717/158 |
| 6,782,542 | B1 | 8/2004 | Mein et al. ................... 719/330 |
| 2002/0046294 | A1 | 4/2002 | Brodsky et al. ............. 709/246 |
| 2003/0014733 | A1 | 1/2003 | Ringseth et al. ............. 717/116 |
| 2003/0023957 | A1 * | 1/2003 | Bau et al. .................... 717/140 |

(Continued)

OTHER PUBLICATIONS

"Mapping CORBA and SOAP", Oct. 31, 2000, http:Ilnenya.msm#. cuni.caseminarsIzooo-1131-kalibera-corba-soaplreferat.html.*

(Continued)

*Primary Examiner*—Wei Y Zhen
*Assistant Examiner*—Junchun Wu
(74) *Attorney, Agent, or Firm*—Woodcock Washburn LLP

(57) ABSTRACT

A system and methods are provided that make compile-time declarative modeling available for SOAP-based data transmission(s). The declarative modeling minimizes the amount of coding required of a developer. The underlying details regarding the SOAP protocol, dispatching to the appropriate object and function, marshaling and un-marshaling of XML and generating the SOAP response are hidden from the developer when implementing SOAP-based Web services. The task of creating a SOAP-based web service is thus greatly simplified by reducing the number and complexity of considerations required of the developer when generating SOAP-based Web services. In one embodiment, attributes for Visual C++ are utilized as a framework for a declarative syntax for SOAP-based Web services, which Visual C++ attributes have access to type and marshaling information.

20 Claims, 31 Drawing Sheets

U.S. PATENT DOCUMENTS

2003/0182624 A1   9/2003  Large
2004/0221292 A1   11/2004 Chiang et al.
2006/0265689 A1   11/2006 Kuznetsov et al.

OTHER PUBLICATIONS

Anderson, K.M., et al., "Chimera: hypertext for heterogeneous software environments," *Third ACM Conf. on Hypertext Proceedings, ECHT '94 Proceedings*, 1994, 94-103.

Creech, M.L., et al., "Using hypertext in selecting reusable software components," *Third ACM Conf. on Hypertext Proceedings*, 1991, 25-38.

Ferrans, J.C., et al., "HyperWeb: a framework for hypermedia-based environments," *Proceedings of the Fifth ACM SIGSOFT Symposium on Software Development Environments*, Web, H. (Ed.), 1992, 1-10.

Horwitz, S., et al., "Generating editing environments based on relations and attributes," *ACM Transactions on Programming Languages and Systems*, 1986, 8(4), 577-608.

Lerner, R.M., "At the forge: Introducing SOAP," *Linux J.*, 2001, vol. 2001, *Issue 83es, Article* No. 11,11 pages.

"Mapping CORBA and SOAP," http://nenya.ms.mff.cuni.cz/seminars/2000-10-31-kalibera-cobra-soap/referat.html, 2000, 13 pages.

Skonnard, A.,"SOAP—The simple object access protocol," http://www.microsoft.com/mind:0100/soap.soap.asp, 2000, 16 pages.

* cited by examiner

FIG. 3A

```
<Envelope xmlns="http://schemas.xmlsoap.org/soap/envelope/">
  <Header>
    <!-- user data -->
  </Header>
  <Body>
    <!-- user data -->
  </Body>
</Envelope>
```

FIG. 3B

```
<SOAP-ENV:Header>
<t:Transaction
     xmlns:t="some-URI" SOAP-ENV:mustUnderstand="1">
       5
</t:Transaction>
</SOAP-ENV:Header>
```

BSTR HelloWorld(BSTR inputString)

```
POST /HelloWorld HTTP/1.1
Host: <someserver>
Content-Type: text/xml
Content-Length: nnnn
SOAPAction: "Some-URI"

<Envelope xmlns="http://schemas.xmlsoap.org/soap/envelope/">
  <Body>
    <HelloWorld xmlns="Some-URI">
      <inputString>StringValue</inputString>
    </HelloWorld>
  </Body>
</Envelope>
```

```
HTTP/1.1 200 OK
Content-Type: text/xml
Content-Length: nnnn

<Envelope xmlns="http://schemas.xmlsoap.org/soap/envelope/">
  <Body>
    <HelloWorldResponse xmlns="Some-URI">
      <return>Hello StringValue</return>
    </HelloWorldResponse>
  </Body>
</Envelope>
```

FIG. 4E

```
#define _WIN32_WINNT 0x0500
#define _ATL_ATTRIBUTES
#include <atlsoap.h>

[ module(name="HelloWorld") ];

[ uuid("643cd054-24b0-4f34-b4a1-642519836ef9"), object ]
__interface IHelloWorld
{
        [id(1)] HRESULT HelloWorld(
          [in] BSTR inputString,
          [out, retval] BSTR *retval);
};
[
        request_handler(
          name="Default",
          sdl="sdl"),
        soap_handler(
          name="HelloWorld",
          namespace="http://atlserver/soap/HelloWorld",
          protocol="soap")
]
class CHelloWorld : public IHelloWorld
{
public:
        [ soap_method ]
        HRESULT HelloWorld(
          BSTR inputString,
          BSTR *retval)
        {
                CComBSTR bstrRet(L"Hello ");
                bstrRet += inputString;

*retval = bstrRet.Detach();

return S_OK;
        }
};
```

```
[ uuid("uuid"), object ]
__interface Interface
{
        [id(1)] HRESULT soapMethod1([idl_attributes] type1 parameter1,
            [idl_attributes] type2 parameter2, ...,
            [idl_attributes] typeN parameterN);

[id(2)] HRESULT soapMethod2([idl_attributes] type1 parameter1,
            [idl_attributes] type2 parameter2, ...,
            [idl_attributes] typeN parameterN);
};

[ request_handler, soap_handler ]
class CClass : public Interface
{
public:
        type1 header1;
        type2 header2;
        // ...
        typeN headerN;

[ soap_method(name="wsdlName") ]
        [ soap_header(value="headerl",
                      in="true|false",
                      out="true|false",
                      required="true|false")
        ]
        HRESULT soapMethod1 (type1 parameter1
                             type2 parameter2, ...,
                             typeN parameterN)
        {
            // user code
        }

[ soap_method(name="wsdlName2") ]
        [ soap_header(value="headerl",
                      in="true|false",
                      out="true|false",
                      required="true|false")
        ]
        HRESULT soapMethod2 (type1 parameter1
                             type2 parameter2, ...,
                             typeN parameterN)
        {
            // user code
        }
```

```
    [ uuid("643cd054-24b0-4f34-b4a1-642519836fe8"), object ]
    __interface Interface
    {
            [id(1)] HRESULT method1([in] bool bInput, [out, retval] bool *bOutput);
    };

[ request_handler, soap_handler ]
class CClass : public Interface
{
    [ soap_method ]
    HRESULT method1(bool bInput, bool *bOutput)
    {
            *bOutput = !bInput;
            return S_OK;
    }
};
```

```
struct ___CClass_method1_struct
{
   bool bInput;
   bool bOutput;
};
```
FIG. 7A

```
extern __declspec(selectany) const _soapmapentry
___CClass_method1_entries[] =
{
    {
        0x38998673,
        "bOutput",
        L"bOutput",
        sizeof("bOutput")-1,
        SOAPTYPE_BOOLEAN,
        SOAPFLAG_RETVAL | SOAPFLAG_OUT,
        offsetof(___CClass_method1_struct, bOutput),
        NULL,
        NULL,
        -1,
    }, {
        0xEA00C812,
        "bInput",
        L"bInput",
        sizeof("bInput")-1,
        SOAPTYPE_BOOLEAN,
        SOAPFLAG_NONE | SOAPFLAG_IN,
        offsetof(___CClass_method1_struct, bInput),
        NULL,
        NULL,
        -1,
    },
    { 0x00000000 }
};
```

FIG. 7B

```
extern __declspec(selectany) const _soapmap
    __CClass_method1_map =
{
    0xDC7296CC,
    "method1",
    L"method1",
    sizeof("method1")-1,
    sizeof("method1")-1,
    SOAPMAP_FUNC,
    __CClass_method1_entries,
    sizeof(__CClass_method1_struct),
    1,
    0
};
```

FIG. 7C

```
extern __declspec(selectany) const _soapmapentry
    __CClass_method1_atlsoapheader_entries[] =
{
    { 0x00000000 }
};
```

FIG. 7D

```
extern __declspec(selectany) const _soapmap
___CClass_method1_atlsoapheader_map =
{
    0xDC7296CC,
    "method1",
    L"method1",
    sizeof("method1")-1,
    sizeof("method1")-1,
    SOAPMAP_HEADER, ___CClass_method1_atlsoapheader_ent
ries,
    0,
    0,
    -1
};
```
— 720

```
extern __declspec(selectany) const _soapmap * ___CClass_funcs[] =
{
    &___CClass_method1_map,
    NULL
};

extern __declspec(selectany) const _soapmap * ___CClass_headers[] =
{
    &___CClass_method1_atlsoapheader_map,
    NULL
};
```

FIG. 7F

```
                                    ┌─800
ATL_NOINLINE inline const _soapmap ** CClass::GetFunctionMap()
   {
   return ___CClass_funcs;
};

ATL_NOINLINE inline const _soapmap ** CClass::GetHeaderMap()
   {
   return ___CClass_headers;
}

ATL_NOINLINE inline void * CClass::GetHeaderValue()
   {
   return this;
}

ATL_NOINLINE inline HRESULT CClass::CallFunction(
        void *pvParam,
        const wchar_t *wszLocalName,
        int cchLocalName,
        size_t nItem)
{
wszLocalName;
cchLocalName;

HRESULT hr = S_OK;

switch(nItem)
        {
        case 0:
          {
              ___CClass_method1_struct *p = (___CClass_method1_struct *) pvParam;
              hr = method1(p->bInput, &p->bOutput);
              break;
          }
        default:
            hr = E_FAIL;
        } return hr;
}s
ATL_NOINLINE inline const wchar_t * CClass::GetNamespaceUri()
    {
    return L"http://atlserver/soap/test";
    }

ATL_NOINLINE inline const char * CClass::GetNamespaceUriA()
    {
    return "http://atlserver/soap/test";
    }

ATL_NOINLINE inline const char * CClass::GetServiceName()
    {
    return "SoapTest";
    }
```

FIG. 9

```
    [ uuid("643cd054-24b0-4f34-b4a1-642519836fe8"), object ]
    __interface Interface
    {
            [id(1)] HRESULT method1([in] bool bInput, [out, retval] bool
*bOutput);
    };

[ request_handler, soap_handler ]
class CClass : public Interface
{
    int Header1;

[ soap_method ]
    [soap_header(value="Header1", in="true", out="false",
required="false")]
    HRESULT method1(bool bInput, bool *bOutput)
    {
            *bOutput = !bInput;
            return S_OK;
    }
};
```

```
struct ___CClass_method1_struct
    {
    bool bInput;
    bool bOutput;
};
```

FIG. 10A

```
extern __declspec(selectany) const _soapmapentry
___CClass_method1_entries[] =
{
    {
            0x38998673,
            "bOutput",
            L"bOutput",
            sizeof("bOutput")-1,
            SOAPTYPE_BOOLEAN,
            SOAPFLAG_RETVAL | SOAPFLAG_OUT,
            offsetof(___CClass_method1_struct, bOutput),
            NULL,
            NULL,
            -1,
    }, {
            0xEA00C812,
            "bInput",
            L"bInput",
            sizeof("bInput")-1,
            SOAPTYPE_BOOLEAN,
            SOAPFLAG_NONE | SOAPFLAG_IN,
            offsetof(___CClass_method1_struct, bInput),
            NULL,
            NULL,
            -1,
    },
    { 0x00000000 }
};
```

FIG. 10B

```
extern __declspec(selectany) const _soapmap
___CClass_method1_map =
{
    0xDC7296CC,
    "method1",
    L"method1",
    sizeof("method1")-1,
    sizeof("method1")-1,
    SOAPMAP_FUNC,
    ___CClass_method1_entries,
    sizeof(___CClass_method1_struct),
    1,
    0
};
```

FIG. 10C — 1010

```
extern __declspec(selectany) const _soapmapentry
___CClass_method1_atlsoapheader_entries[] =
{
    {
        0xFAD45C89,
        "Header1",
        L"Header1",
        sizeof("Header1")-1,
        SOAPTYPE_INT,
        SOAPFLAG_NONE | SOAPFLAG_IN,
        offsetof(CClass, Header1),
        NULL,
        NULL,
        -1,
    },
    { 0x00000000 }
};
```

FIG. 10D — 1015

```
extern __declspec(selectany) const _soapmap
___CClass_method1_atlsoapheader_map =
{
    0xDC7296CC,
    "method1",
    L"method1",
    sizeof("method1")-1,
    sizeof("method1")-1,
    SOAPMAP_HEADER, ___CClass_method1_atlsoapheader_entries,
    0,
    0,
    -1
};
```
— 1020

FIG. 10E

```
extern __declspec(selectany) const _soapmap *
___CClass_funcs[] =
{
    &___CClass_method1_map,
    NULL
};

extern __declspec(selectany) const _soapmap *
___CClass_headers[] =
{
    &___CClass_method1_atlsoapheader_map,
    NULL
};
```
— 1025

FIG. 10F

```
ATL_NOINLINE inline const _soapmap ** CClass::GetFunctionMap()
   {
   return ___CClass_funcs;
};

ATL_NOINLINE inline const _soapmap ** CClass::GetHeaderMap()
   {
   return ___CClass_headers;
}

ATL_NOINLINE inline void * CClass::GetHeaderValue()
   {
   return this;
}
```

```
                    •
                    •
                    •
ATL_NOINLINE inline HRESULT CClass::CallFunction(
      void *pvParam,
      const wchar_t *wszLocalName,
      int cchLocalName,
      size_t nItem)
{
wszLocalName;
cchLocalName;

HRESULT hr = S_OK;

switch(nItem)
      {
case 0:
    {
        ___CClass_method1_struct *p = (___CClass_method1_struct *) pvParam;
        hr = method1(p->bInput, &p->bOutput);
        break;
    }
default:
    hr = E_FAIL;
} return hr;
}s

ATL_NOINLINE inline const wchar_t * CClass::GetNamespaceUri()
    {
    return L"http://atlserver/soap/test";
}

ATL_NOINLINE inline const char * CClass::GetNamespaceUriA()
    {
    return "http://atlserver/soap/test";
}

ATL_NOINLINE inline const char * CClass::GetServiceName()
    {
    return "SoapTest";
}
```

FIG. 12

```
[ export ]
enum TestEnum { Test_Zero, Test_One, Test_Two, Test_Three, Test_Four };

[ export ]
typedef struct
{
            int n;
      double d;
      BSTR s;
      int arr[2][4];
} TestStruct;

[ uuid("643cd054-24b0-4f34-b4a1-642519836fe8"), object ]
      __interface Interface
      {
            [id(1)] HRESULT method1([in] TestStruct t, [out, retval]
TestEnum *e);
      };

[ request_handler, soap_handler ]
class CClass : public Interface
{
      [ soap_method ]
      HRESULT method1(TestStruct , TestEnum *e)
      {
            // user code ...
      }
};
```

FIG. 13A 1300

```
__if_not_exists(__TestEnum_entries)
{
  extern __declspec(selectany) const _soapmapentry __TestEnum_entries[] =
  {
     { 0x18AD26DB, "Test_Four", L"Test_Four", sizeof("Test_Four")-1, 4,
SOAPFLAG_FIELD, 0, NULL, NULL, -1 },
     { 0x2F4B7497, "Test_Three", L"Test_Three", sizeof("Test_Three")-1, 3,
SOAPFLAG_FIELD, 0, NULL, NULL, -1 },
     { 0xF8FDB9D9, "Test_Two", L"Test_Two", sizeof("Test_Two")-1, 2,
SOAPFLAG_FIELD, 0, NULL, NULL, -1 },
     { 0xF8FDA361, "Test_One", L"Test_One", sizeof("Test_One")-1, 1,
SOAPFLAG_FIELD, 0, NULL, NULL, -1 },
     { 0x18B7F37F, "Test_Zero", L"Test_Zero", sizeof("Test_Zero")-1, 0,
SOAPFLAG_FIELD, 0, NULL, NULL, -1 },
     { 0x00000000 }
  };
```

1305

```
   extern __declspec(selectany) const _soapmap __TestEnum_map =
   {
     0xF8EFE655,
     "TestEnum",
     L"TestEnum",
     sizeof("TestEnum")-1,
     sizeof("TestEnum")-1,
     SOAPMAP_ENUM,
     __TestEnum_entries,
     sizeof(::TestEnum),
     1,
     -1
   };
}
```

FIG. 13B

```
__if_not_exists(___TestStruct_entries)
{
extern __declspec(selectany) const int ___TestStruct_arr_dims[] = {2, 2, 4, };

extern __declspec(selectany) const _soapmapentry ___TestStruct_entries[] =
    {
        {
                0x0000006E,
                "n",
                L"n",
                sizeof("n")-1,
                SOAPTYPE_INT,
                SOAPFLAG_FIELD,
                offsetof(::TestStruct, n),
                NULL,
                NULL,
                0
        },
        {
                0x00000064,
                "d",
                L"d",
                sizeof("d")-1,
                SOAPTYPE_DOUBLE,
                SOAPFLAG_FIELD,
                offsetof(::TestStruct, d),
                NULL,
                NULL,
                0
        },
                    •
                    •
                    •
```

{
        0x00000073,
        "s",
        L"s",
        sizeof("s")-1,
        SOAPTYPE_STRING,
        SOAPFLAG_FIELD,
        offsetof(::TestStruct, s),
        NULL,
        NULL,
        0
    },
    {
        0x0001ABC5,
        "arr",
        L"arr",
        sizeof("arr")-1,
        SOAPTYPE_INT,
        SOAPFLAG_FIELD | SOAPFLAG_FIXEDARR,
        offsetof(::TestStruct, arr),
        ___TestStruct_arr_dims,
        NULL,
        0
    },
    { 0x00000000 }
};
```

FIG. 13E  1315

```
extern __declspec(selectany) const _soapmap ___TestStruct_map =
    {
        0x15962585,
        "TestStruct",
        L"TestStruct",
        sizeof("TestStruct")-1,
        sizeof("TestStruct")-1,
        SOAPMAP_STRUCT,
        ___TestStruct_entries,
        sizeof(::TestStruct),
        4,
        -1
    };
}
```

1320

```
struct ___CClass_method1_struct
    {
    TestStruct tIn;
    TestEnum eOut;
};
```

FIG. 13F

```
extern __declspec(selectany) const _soapmapentry
___CClass_method1_entries[] =
{
    {
        0x38998673,
        "eOut",
        L"eOut",
        sizeof("eOut")-1,
        SOAPTYPE_UNK,
        SOAPFLAG_RETVAL | SOAPFLAG_OUT,
        offsetof(___CClass_method1_struct, eOut),
        NULL,
        &___TestEnum_map,
        -1,
    },
    {
        0xEA00C812,
        "bInput",
        L"bInput",
        sizeof("bInput")-1,
        SOAPTYPE_UNK,
        SOAPFLAG_NONE | SOAPFLAG_IN,
        offsetof(___CClass_method1_struct, tIn),
        NULL,
        &___TestStruct_map,
        -1,
    },
    { 0x00000000 }
};
```

```
extern __declspec(selectany) const _soapmap ___CClass_method1_map =
{
    0xDC7296CC,
    "method1",
    L"method1",
    sizeof("method1")-1,
    sizeof("method1")-1,
    SOAPMAP_FUNC,
    ___CClass_method1_entries,
    sizeof(___CClass_method1_struct),
    1,
    0
};
```

SYSTEM AND METHODS FOR PROVIDING A DECLARATIVE SYNTAX FOR SPECIFYING SOAP-BASED WEB SERVICES

CROSS REFERENCE TO RELATED APPLICATIONS

This application is a Continuation of U.S. patent application Ser. No. 09/902,818, filed Jul. 10, 2001, entitled SYSTEM AND METHODS FOR PROVIDING A DECLARATIVE SYNTAX FOR SPECIFYING SOAP-BASED WEB SERVICES, which relates to application U.S. patent application Ser. No. 09/169,383, filed Oct. 9, 1998, entitled "EXTENDING PROGRAM LANGUAGES WITH SOURCE-PROGRAM ATTRIBUTE TAGS" which are incorporated herein by reference in their entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright© 2000, Microsoft Corp.

FIELD OF THE INVENTION

The present invention relates to the provision of a declarative syntax for SOAP-based Web services. More particularly, the present invention relates to a system and methods for providing compile-time declarative modeling for SOAP-based data transmission, and the minimization of coding in connection with SOAP-based Web services by a developer.

BACKGROUND OF THE INVENTION

Over time, the desired range of functionality of computer programs has increased quite significantly making programming an increasingly cumbersome and complex task. Some programming languages tend to be better than others at performing some types of tasks, but in general, the later in time the programming language was introduced, the more complex functionality that the programming language possesses, empowering today's developers more and more. Along with this empowerment, however, comes a concomitant learning curve and degree of care that is required of a developer in order to generate sophisticated, competent code. Further increasing the need for evolved software in today's computing environments is that software is being transported from computing device to computing device and across platforms more and more. Thus, developers are becoming interested in aspects of the software beyond bare bones standalone personal computer (PC) functionality. With the advent of parallel processing, complex computer programming languages, transmission of programs and data across networks, and cross platform computing, programming techniques have grown to be considerably more complex, and capable of much more than the simple standalone instruction by instruction model once known.

In this regard, Simple Object Access Protocol (SOAP) was developed as a way for a program or other object running in one kind of operating system, such as MICROSOFT® WINDOWS®, on one device to communicate with a program or other object in the same or another kind of an operating system, such as Linux, on another device by using the World Wide Web's HyperText Transfer Protocol (HTTP) and extensible Markup Language (XML) as the mechanisms for information exchange. Since Web protocols are installed and available for use by all major operating system platforms, HTTP and XML provide an already at-hand solution to the problem of how programs running under different operating systems in a network can communicate with each other. SOAP specifies exactly how to encode an HTTP header and an XML file so that a program in one computer can call a program in another computer and pass it information. It also specifies how the called program can return a response.

SOAP was developed by a consortium of software companies, and has been proposed as a standard interface to be adopted by the World Wide Web Consortium (W3C). It is somewhat similar to the Internet Inter-ORB Protocol (IIOP), a protocol that is part of the Common Object Request Broker Architecture (CORBA). SUN MICROSYSTEMS'® Remote Method Invocation (RMI) is a similar client/server interprogram protocol between programs written in Java.

An advantage of SOAP is that program calls are much more likely to circumvent or pass through firewall servers that, through the designated port mechanism, screen out requests other than those for known applications. Since HTTP requests are usually allowed through firewalls, programs using SOAP to communicate can be reasonably sure that they can communicate with programs anywhere the Internet reaches.

The above background illustrates (1) that computer programming needs can change quickly in a very short time along with the changing computing environments in which they are intended to operate and (2) that computing programming environments are considerably more complex than they once were. As computing environments become more and more complex, there is generally a greater need for uniformity of functionality across platforms, uniformity among programming language editors, uniformity among programming language compilers and run time aspects of programming. In short, as today's computer system architectures have quickly expanded to the limits of the Earth via global networks, the types of programming tasks that are possible and desirable has also expanded to new limits. For example, since a program may traverse hundreds, if not hundreds of thousands of computers, as a result of copying, downloading or other transmission of the source or object code, developed by a plurality of unknown developers, affiliated with one another or not, the program, program object or program output may not always be understood at or capable of reaching a given destination. In particular, there has grown a need for programmers and computing devices to be able to simplify communications involving and coding for implementing SOAP-based Web services. Under current techniques for implementing SOAP-based Web services, a developer is generally required to write repetitive, error-prone and lengthy code making the coding process cumbersome.

Due to the difficulty of writing effective web services and converting existing code into web services, developers will need technologies and tools to make their jobs easier. There is thus a need for a declarative syntax for specifying SOAP-based web services, especially as web service developers move towards the .NET platform in order to provide an easy to use and systematic way to develop web services. Thus, as networked computing environments continue to push the limits, it would be desirable to combine flexible declarative capabilities with a programming language when implementing SOAP-based communications. There is a further need for a mechanism that substantially reduces the amount and complexity of coding required of a developer in connection with the implementation of SOAP-based Web services.

SUMMARY OF THE INVENTION

In view of the foregoing, the present invention provides a system and methods for providing compile-time declarative modeling for SOAP-based data transmission(s) that minimizes the amount of coding required of a developer. The underlying details regarding the SOAP protocol, dispatching to the appropriate object and function, marshaling and un-marshaling of XML and generating the SOAP response are hidden from the developer when implementing SOAP-based Web services. The present invention thus greatly simplifies creating a SOAP-based web service by reducing the number and complexity of considerations required of the developer when generating SOAP-based Web services. In one embodiment, attributes for Visual C++ are utilized as a framework for a declarative syntax for SOAP-based Web services, which Visual C++ attributes have access to type and marshaling information via an attribute provider.

Other features of the present invention are described below.

BRIEF DESCRIPTION OF THE DRAWINGS

The system and methods for providing a declarative syntax for SOAP-based Web services are further described with reference to the accompanying drawings in which:

FIGS. 3A and 3B show computer programming language pseudocode illustrating exemplary formatting of a SOAP message in connection with the present invention;

FIGS. 4C and 4D illustrate exemplary formatting of a typical "Hello World" SOAP HTTP request and response, respectively;

FIG. 4E illustrates exemplary pseudocode implementing the declarative syntax of the present invention in connection with the "Hello World" example of FIGS. 4A through 4D;

FIG. 5 illustrates exemplary formatting for code that a developer implements in accordance with the declarative syntax of the present invention;

FIG. 6 illustrates first exemplary pseudocode written in accordance with the declarative syntax of the present invention that implements a SOAP Method with integral types as parameters;

FIGS. 7A through 7F illustrate exemplary data generated by an attribute provider in accordance with the present invention based upon parsing of the pseudocode of FIG. 6;

FIGS. 8A and 8B illustrate exemplary implementations for member functions and implementation maps declared for a "soap_handler" attribute injected by an attribute provider in accordance with the present invention;

FIG. 9 illustrates second exemplary pseudocode written in accordance with the declarative syntax of the present invention that implements a SOAP Method with an integral type SOAP Header;

FIGS. 10A through 10C illustrate exemplary data generated by an attribute provider in accordance with the present invention based upon parsing of the pseudocode of FIG. 9;

FIG. 10D through 10F illustrate exemplary marshaling data injected by an attribute provider in connection with the processing of the second exemplary pseudocode of FIG. 9;

FIGS. 11A and 11B illustrate exemplary implementations for member functions and implementation maps declared for a "soap_handler" attribute injected by an attribute provider in accordance with the present invention;

FIG. 12 illustrates third exemplary pseudocode written in accordance with the declarative syntax of the present invention that implements a SOAP Method with complex type parameters;

FIGS. 13A through 13H illustrate exemplary marshaling data created by an attribute provider of the present invention in connection with the processing of the third exemplary pseudocode of FIG. 12;

DETAILED DESCRIPTION OF PREFERRED EMBODIMENTS

Overview

Figure 1:
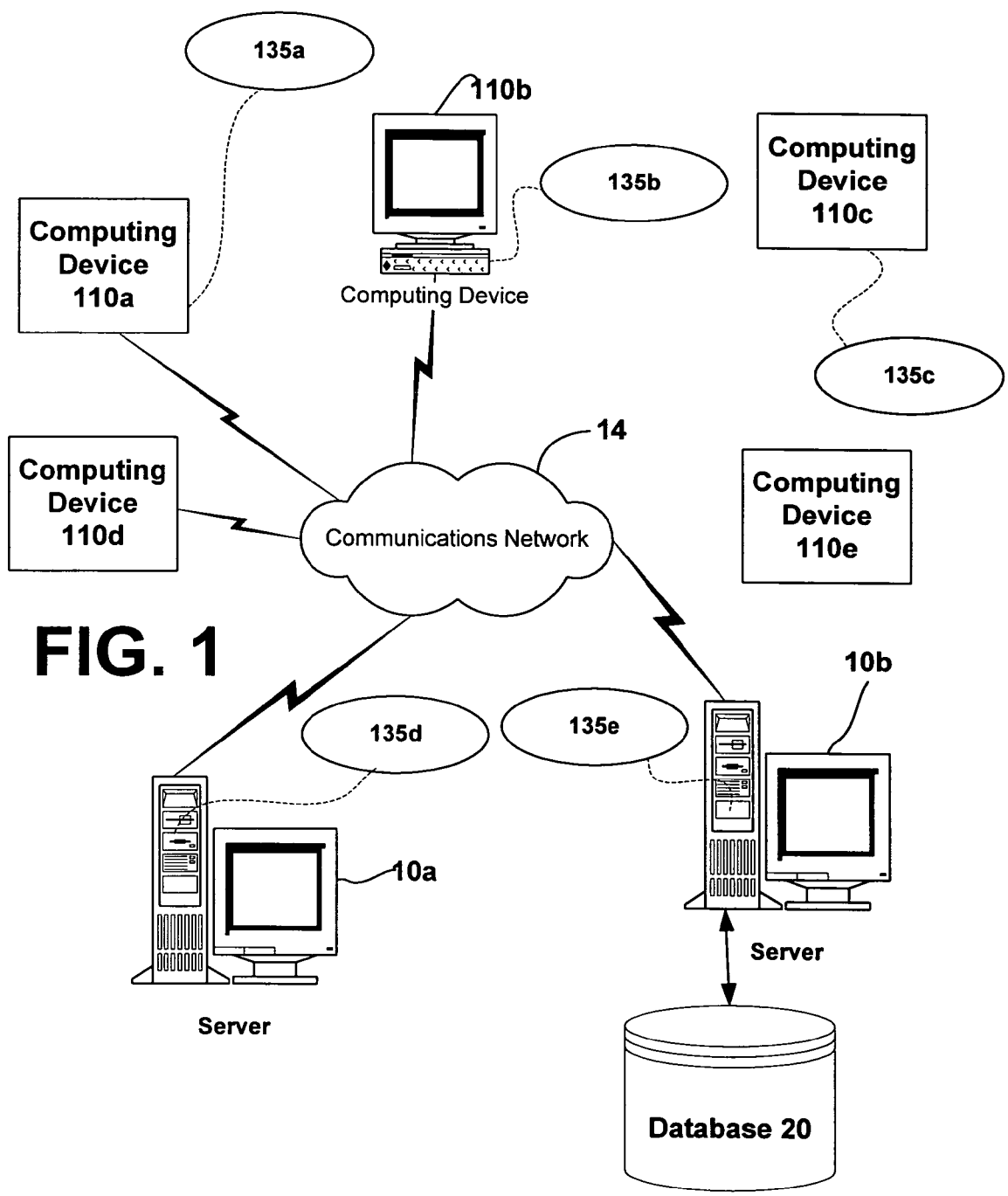
FIG. 1 is a block diagram representing an exemplary network environment in which the present invention may be implemented.

The present invention provides a system and methods for providing compile-time declarative modeling for SOAP-based data transmission(s). The present invention also minimizes the amount of coding required of a developer in connection with the implementation of SOAP-based Web services. The present invention thus greatly simplifies creating a SOAP-based web service by reducing the number and complexity of considerations required of the developer when generating SOAP-based web services.

In one embodiment, attributes for Visual C++ are utilized for the declarative syntax of the present invention. Such use of attributes, for example, is described in commonly assigned copending U.S. patent application Ser. No. 09/169,383, filed Oct. 9, 1998, entitled "Extending Program Languages with Source-Program Attribute Tags." In accordance with the invention, Visual C++ attributes may be used to specify a SOAP-based web service, which attributes have access to type and marshaling information. Further, in another embodiment of the invention, the use of embedded interface definition language (IDL) allows attributes to leverage existing Visual C++compiler technology and present a familiar programming model to component object model (COM) developers. For example, the use of IDL as it may pertain to the present invention in one embodiment is described in more detail in commonly assigned copending U.S. patent application Ser. No. 09/611,403, filed Jul. 6, 2000, entitled "Unification of a Programming Language and a Definition Language." Thus, in accordance with one embodiment of the present invention, the user describes their Web service interface using embedded IDL. In connection with the operation of an attribute provider in accordance with the invention, a compiler operates to implement SOAP-based Web services written according to the declarative syntax of the present invention. The invention is thus easy to use, so that a Web service developer may implement SOAP-based Web services without being required to understand the underlying details regarding the SOAP protocol, dispatching to the appropriate object and function, marshaling the XML, un-marshaling the XML, and generating the SOAP response.

The present invention provides means to take a simple user specification for a SOAP-based Web service, and at compile-time generate all of the information utilized for the creation of SOAP messages at run-time. Thus, the present invention provides means to convert programming language constructs, e.g., C++ programming language constructs, into SOAP messages via a compile-time interaction. Then, the code and data generated at compile time is utilized when actually receiving and sending SOAP messages.

Exemplary Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to perform programming services that may utilize SOAP-based communications. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP) for the SOAP-based communications. Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 or other storage element in accordance with the present invention, such as a database 20 for storing software having the capabilities of the present invention. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Exemplary Computing Device

Figure 2:
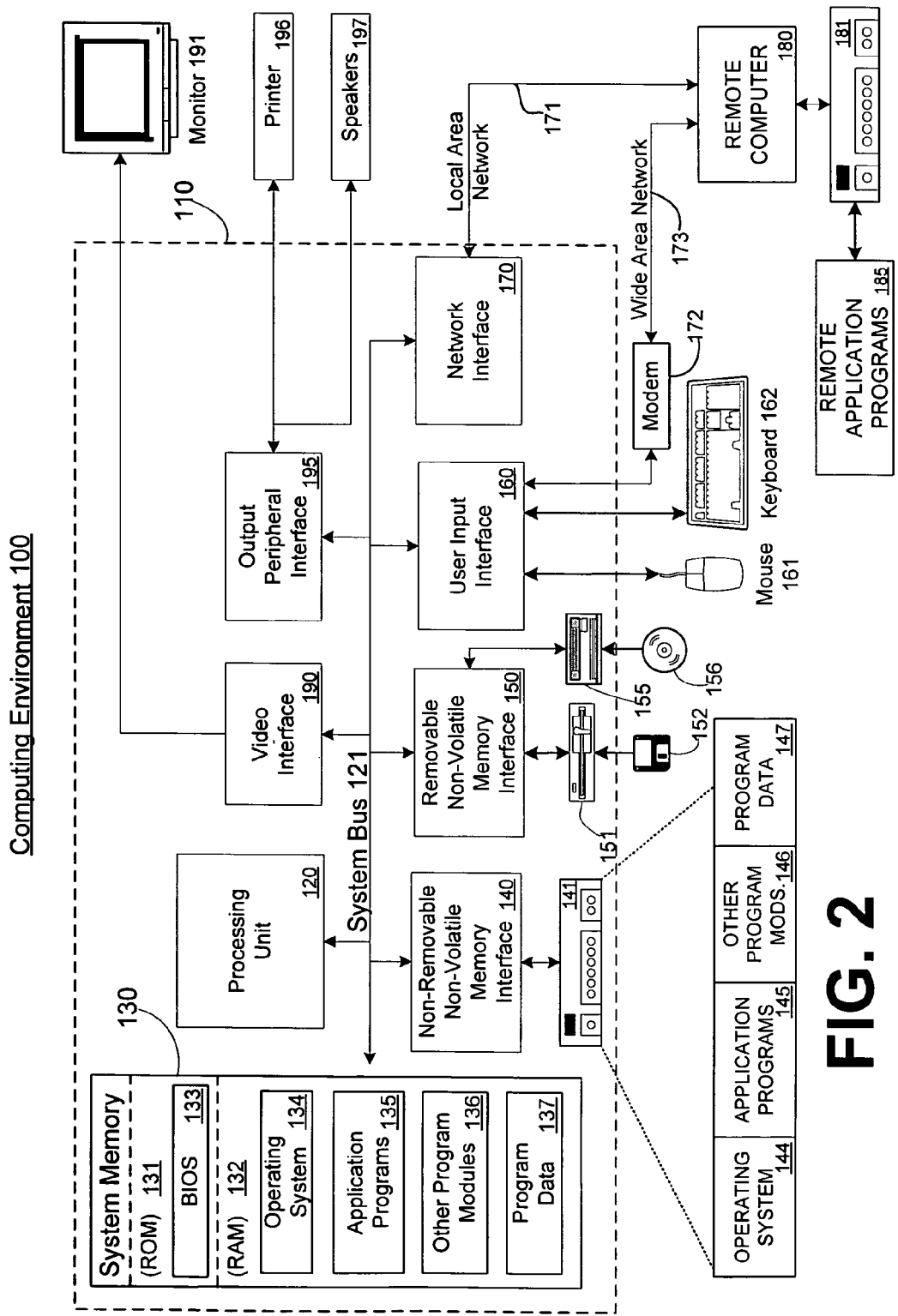
FIG. 2 is a block diagram representing an exemplary non-limiting computing device that may be present in an exemplary network environment, such as described in FIG. 1.

FIG. 2 and the following discussion are intended to provide a brief general description of a suitable computing environment in which the invention may be implemented. It should be understood, however, that handheld, portable and other computing devices of all kinds are contemplated for use in connection with the present invention. While a general purpose computer is described below, this is but one example. Additionally, the present invention may be implemented in an environment of networked hosted services in which very little or minimal client resources are implicated, e.g., a networked environment in which the client device serves merely as a browser or interface to the World Wide Web.

Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Software may be designed using many different methods, including object-oriented programming methods. C++, Java, etc. are examples of common object-oriented programming languages that provide functionality associated with object-oriented programming. Object-oriented programming methods provide a means to encapsulate data members, e.g. variables, and member functions, e.g. methods, that operate on that data into a single entity called a class. Object-oriented programming methods also provide means to create new classes based on existing classes.

An object is an instance of a class. The data members of an object are characteristics that are stored inside the computer memory, and the methods are executable computer code that act upon this data, along with potentially providing other services. The present invention expands the declarative capabilities of a programming language with respect to SOAP-based communications.

Exemplary Languages and the .NET Framework

In exemplary embodiments of the declarative syntax for SOAP-based communications as described herein, the present invention is described in connection with the C++ programming language. However, one of ordinary skill in the art will readily recognize that the present invention may be implemented with any programming language, such as Fortran, Pascal, Visual Basic, C, C#, Java, etc.

While exemplary embodiments herein are described in connection with C++, the declarative capabilities of the present invention may also be supported in all of MICROSOFT®'s .NET languages. .Net is a computing framework that has been developed in light of the convergence of personal computing and the Internet. Individuals and business users alike are provided with a seamlessly interoperable and Web-enabled interface for applications and computing devices, making computing activities increasingly Web browser or network-oriented. In general, the .Net platform includes servers, building-block services, such as Web-based data storage and downloadable device software.

Generally speaking, the .Net platform provides (1) the ability to make the entire range of computing devices work together and to have user information automatically updated and synchronized on all of them, (2) increased interactive capability for Web sites, enabled by greater use of XML (Extensible Markup Language) rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

SOAP-Based Communications

A SOAP message is an XML document that comprises a SOAP envelope, an optional SOAP header and a SOAP body. The basic format of a SOAP message is illustrated in exemplary pseudocode 300 of FIG. 3A. The SOAP envelope is the top element of the XML document representing the message. The SOAP header is a generic mechanism for adding features to a SOAP message in a decentralized manner without prior agreement between the communicating parties. SOAP defines a few properties that can be used to indicate who should deal with a feature and whether it is optional or mandatory. The SOAP body is a container for mandatory information intended for the ultimate recipient of the message. For the envelope, the element name is "Envelope" and is present in the SOAP message. The element may contain namespace declarations as well as additional properties. If present, such additional properties are namespace-qualified. Similarly, the element may contain additional sub elements, but if present these elements are namespace-qualified and follow the SOAP body element.

For the header, the element name is "Header" and the element may be present in a SOAP message. If present, the element is the first immediate child element of a SOAP Envelope element. The element may contain a set of header entries with each being an immediate child element of the SOAP header element. All immediate child elements of the SOAP Header element are namespace-qualified.

For the body, the element name is "Body" and the element is present in a SOAP message and is an immediate child element of a SOAP envelope element. The element directly follows the SOAP header element, if present. Otherwise, it is the first immediate child element of the SOAP envelope element. The element may contain a set of body entries each being an immediate child element of the SOAP body element. Immediate child elements of the SOAP Body element may be namespace-qualified. SOAP defines the SOAP fault element, which is an immediate child element of the SOAP body element, which is used to indicate error messages.

The SOAP encodingStyle global property can be used to indicate the serialization rules used in a SOAP message. This attribute may appear on any element, and is scoped to that element's contents and all child elements not themselves containing such an property, much as an XML namespace declaration is scoped. There is no default encoding defined for a SOAP message. The property value is an ordered list of one or more Uniform Resource Identifiers (URIs) identifying the serialization rule or rules that can be used to deserialize the SOAP message indicated in the order of most specific to least specific. Messages using this particular serialization should indicate this using the SOAP encodingStyle property. A value of the zero-length URI i.e. " ", explicitly indicates that no claims are made for the encoding style of contained elements. This can be used to turn off any claims from containing elements.

SOAP does not define a traditional versioning model based on major and minor version numbers. A SOAP message has an envelope element associated with the envelope URI namespace. If a message is received by a SOAP application in which the SOAP envelope element is associated with a different namespace, the application treats this as a version error and discards the message. If the message is received through a request/response protocol such as HTTP, the application responds with a SOAP VersionMismatch faultcode message using the SOAP envelope URI namespace.

SOAP provides a flexible mechanism for extending a message in a decentralized and modular way without prior knowledge between the communicating parties. Typical examples of extensions that can be implemented as header entries are authentication, transaction management, payment etc. The header element is encoded as the first immediate child element of the SOAP Envelope XML element. All immediate child elements of the Header element are called header entries.

Three encoding rules for header entries are as follows: (1) A header entry is identified by its fully qualified element name, which consists of the namespace URI and the local name. All immediate child elements of the SOAP Header element are namespace-qualified. (2) The SOAP encodingStyle property may be used to indicate the encoding style used for the header entries. (3) The SOAP mustUnderstand property and SOAP actor property may be used to indicate how to process the entry and by whom.

SOAP header properties determine how a recipient of a SOAP message should process the message. A SOAP application generating a SOAP message uses the SOAP header properties on immediate child elements of the SOAP header element. The recipient of a SOAP message ignores all SOAP header properties that are not applied to an immediate child element of the SOAP header element.

An example of a header with an element identifier of "Transaction," a "mustUnderstand" value of "1" and a value of 5 may be encoded as shown in the exemplary code 305 of FIG. 3B.

A SOAP message travels from the originator to a destination, potentially by passing through a set of SOAP intermediaries along the message path. A SOAP intermediary is an application that is capable of both receiving and forwarding SOAP messages. Both intermediaries as well as the ultimate destination are identified by a URI.

Not all parts of a SOAP message may be intended for the ultimate destination of the SOAP message, but instead may be intended for one or more of the intermediaries on the message path. The role of a recipient of a header element is similar to that of accepting a contract in that it cannot be extended beyond the recipient. That is, a recipient receiving a header element does not forward that header element to the next application in the SOAP message path. The recipient may insert a similar header element, but in that case, the contract is between that application and the recipient of that header element.

The SOAP actor global property can be used to indicate the recipient of a header element. The value of the SOAP actor property is a URI. For example, the special URI "http://schemas.xmlsoap.org/soap/actor/next" indicates that the header element is intended for the very first SOAP application that processes the message. This is similar to the hop-by-hop scope model represented by the connection header field in HTTP. Omitting the SOAP actor property indicates that the recipient is the ultimate destination of the SOAP message. This property appears in the SOAP message instance in order to be effective.

The SOAP mustUnderstand global property can be used to indicate whether a header entry is mandatory or optional for the recipient to process. The recipient of a header entry is defined by the SOAP actor property. The value of the mustUnderstand property is either "1" or "0." The absence of the SOAP mustUnderstand property is semantically equivalent to its presence with the value "0."

If a header element is tagged with a SOAP mustUnderstand property with a value of "1," the recipient of that header entry either obeys the semantics, as conveyed by the fully qualified name of the element, and processes correctly to those semantics or the recipient of that header entry fails to process the message.

The SOAP mustUnderstand property allows for robust evolution. Elements tagged with the SOAP mustUnderstand property with a value of "1" are presumed to somehow modify the semantics of their parent or peer elements. Tagging elements in this manner assures that this change in semantics is not silently ignored by those who may not fully understand it. This property appears in the instance in order to be effective.

The SOAP body element provides a simple mechanism for exchanging mandatory information intended for the ultimate recipient of the message. Typical uses of the body element include marshalling Remote Procedure Calls (RPCs) and error reporting. The body element is encoded as an immediate child element of the SOAP envelope XML element. If a header element is present, then the body element immediately follows the header element; otherwise, it is the first immediate child element of the envelope element.

All immediate child elements of the body element are called body entries and each body entry is encoded as an independent element within the SOAP body element.

Two encoding rules for body entries are as follows: (1) A body entry is identified by its fully qualified element name, which consists of the namespace URI and the local name. Immediate child elements of the SOAP Body element may be namespace-qualified. (2) The SOAP encodingStyle property may be used to indicate the encoding style used for the body entries. SOAP defines one body entry, which is the fault entry used for reporting errors.

While the header and body are defined as independent elements, they are related. The relationship between a body entry and a header entry is as follows: A body entry is semantically equivalent to a header entry intended for the default actor and with a SOAP mustUnderstand property with a value of "1." The default actor is indicated by not using the actor property.

The SOAP fault element is used to carry error and/or status information within a SOAP message. If present, the SOAP fault element appears as a body entry and does not appear more than once within a body element.

The SOAP fault element defines the following four subelements: faultcode, faultstring, faultactor and detail elements.

The faultcode element is intended for use by software to provide an algorithmic mechanism for identifying the fault. The faultcode is present in a SOAP fault element and the faultcode value is a qualified name. SOAP defines a small set of SOAP fault codes covering basic SOAP faults.

The faultstring element is intended to provide a human readable explanation of the fault and is not intended for algorithmic processing. The faultstring element is similar to the 'Reason-Phrase' defined by HTTP and is present in a SOAP fault element and should provide at least some information explaining the nature of the fault.

The faultactor element is intended to provide information about who caused the fault to happen within the message path. The faultactor element is similar to the SOAP actor property, but instead of indicating the destination of the header entry, it indicates the source of the fault. The value of the faultactor property is a URI identifying the source. Applications that do not act as the ultimate destination of the SOAP message include the faultactor element in a SOAP Fault element. The ultimate destination of a message MAY use the faultactor element to indicate explicitly that it generated the fault.

The detail element is intended for carrying application specific error information related to the body element. It is present if the contents of the body element could not be successfully processed. It may not be used to carry information about error information belonging to header entries. Detailed error information belonging to header entries is carried within header entries.

The absence of the detail element in the Fault element indicates that the fault is not related to processing of the Body element. This can be used to distinguish whether the Body element was processed or not in case of a fault situation.

Immediate child elements of the detail element are called detail entries and each detail entry is encoded as an independent element within the detail element.

The encoding rules for detail entries are as follows: (i) A detail entry is identified by its fully qualified element name, which consists of the namespace URI and the local name. Immediate child elements of the detail element may be namespace-qualified, (ii) The SOAP encodingStyle property may be used to indicate the encoding style used for the detail entries and (iii) Other fault subelements may be present, provided they are namespace-qualified.

The faultcode values defined are used in the faultcode element when describing faults defined by SOAP. The default SOAP faultcode values are defined in an extensible manner that allows for new SOAP faultcode values to be defined while maintaining backwards compatibility with existing faultcode values. The mechanism used is very similar to the 1xx, 2xx, 3xx etc. basic status classes defined in HTTP; however, instead of integers, they are defined as XML qualified names. The character "." (dot) is used as a separator of faultcode values indicating that what is to the left of the dot is a more generic fault code value than the value to the right. For example, in the example 'Client.Authentication', client is a more generic fault code value than authentication.

The set of faultcode values include VersionMismatch, MustUnderstand, Client and Server. The VersionMismatch faultcode value indicates the processing party found an invalid namespace for the SOAP envelope element. The MustUnderstand faultcode value indicates an immediate child element of the SOAP Header element that was either not understood or not obeyed by the processing party contained a SOAP mustUnderstand property with a value of "1." With respect to the Client faultcode value, the Client class of errors indicate that the message was incorrectly formed or did not contain the appropriate information in order to succeed. For example, the message could lack the proper authentication or payment information. It is generally an indication that the message should not be resent without change. The Server class of errors indicate that the message could not be processed for reasons not directly attributable to the contents of the message itself, but rather attributable to the processing of the message. For example, processing could include communicating with an upstream processor, which did not respond. The message may succeed at a later point in time.

Other or further features and/or description of SOAP-based communications may be obtained freely by contacting an appropriate standards organization, such as W3C, and the SOAP specification is otherwise freely available on-line and in possession of those of ordinary skill in the art.

A Declarative Syntax for Specifying SOAP-Based Web Services

Thus, in summary of the above, SOAP is a protocol for exchange of information in a distributed environment. This is achieved by the exchange of SOAP "messages." For the purposes of the present description, SOAP may be thought of as a Remote Procedure Call (RPC) protocol that uses HTTP as its transport and XML as its data format, or packaging. It is important to note, however, that neither SOAP, nor the syntax for specifying SOAP-based web services as described herein are limited to HTTP as a transport, and thus the present invention may be applied to any transport protocol, such as file transfer protocol (FTP), Transmission Control Protocol (TCP), User Datagram Protocol (UDP), Internet Relay Chat (IRC) a.k.a. Peer-to-Peer, Telnet, Gopher, snail mail, morse code, etc. suited to transporting a declarative language, such as XML. In this regard, one data stream for reading and one data stream for writing are utilized in accordance with the present invention, and thus any protocol chosen to translate between two streams will work with the invention. A SOAP message is an XML document with predefined elements that may have user-defined data as sub-elements. The header element of the SOAP message is optional and the envelope and body are required elements of the SOAP message.

While exemplary implementations of the present invention make use of particular names that expose the functionality of the present invention, the present invention is by no means limited thereto. One of ordinary skill in the art will recognize that there are a variety of software means to expose the functionality of the present invention, and thus the present invention is by no means limited to the names of the classes, structs, C++ constructs and other implementation-specific details as described below. To the contrary, the invention is to be regarded in the context of facilitating the development of SOAP-based Web services by providing compile time means for injecting code and data for run-time creation, sending and receiving of SOAP messages by Web services.

Figures 4A, 4B:
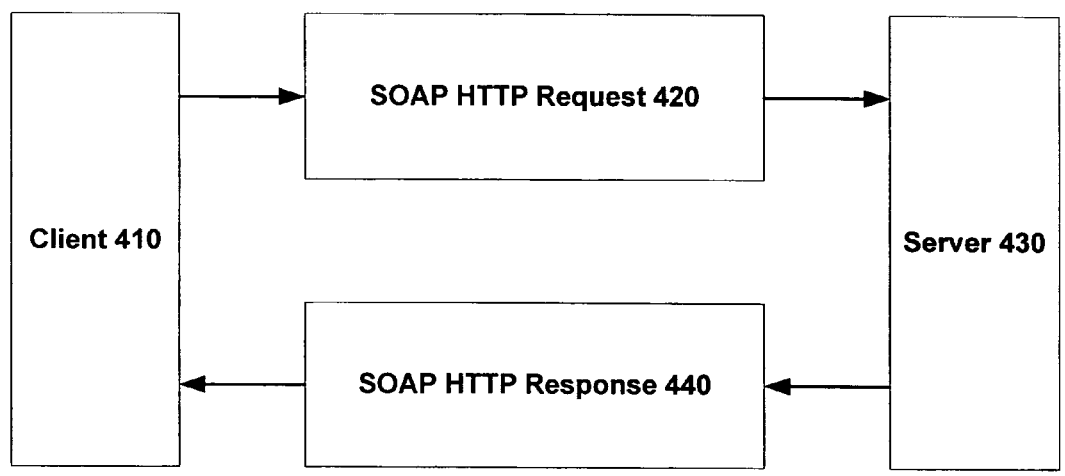
FIGS. 4A and 4B illustrate exemplary formatting and processing of a typical "Hello World"-style HTTP SOAP request in connection with a C++ function.

The format and processing of a typical "Hello World"-style HTTP SOAP request in connection with the C++ function pseudocode 400 of FIG. 4A are described in connection with the block diagram of FIG. 4B. The function named "HelloWorld" takes a string parameter as input i.e., a BSTR is a string type, and the function also returns a string.

Code or pseudocode 400 implicates a typical scenario by which a function can be invoked remotely via SOAP and HTTP. FIG. 4B illustrates the lifetime of a SOAP HTTP request. Client 410 sends a SOAP HTTP Request 420 to server 430 and server 430 responds to client 410 via SOAP HTTP Response 440.

The format of a typical "Hello World" SOAP HTTP request is illustrated in FIG. 4C by exemplary pseudocode 450. The first part of the request contains common HTTP headers, with the addition of an HTTP SOAP request-specific SOAPAction header. The SOAP message portion follows the format described above (note the absence of the "Header" element). The user data under the "Body" property is one possible encoding of a "Hello World" RPC request. The element "inputString" is a parameter to the function "HelloWorld" and has the value "StringValue".

When the server 430 receives this message, server 430: (i) determines the intended recipient of the message comprising the "HelloWorld" function, (ii) parses the XML of the message and marshals the parameters e.g., "inputString," into real C++ data types i.e., a string in this case, (iii) calls the intended recipient of the "HelloWorld" function with the expected parameters e.g., "inputString" and (iv) after the function call, server 430 takes the output parameters and return value and generates a SOAP HTTP response message to send back to the client 410.

The format of a typical "Hello World" SOAP HTTP response is illustrated by exemplary pseudocode 455 of FIG. 4D.

One of ordinary skill in the art can appreciate from the description of the steps that server 430 executes for each message that the user/developer must implement a great deal of XML parsing and XML generating code, and this code must be rewritten for each different function/message that the server 430 wishes to expose via SOAP. In this regard, the present invention greatly simplifies creating a SOAP-based web service by reducing the number and complexity of considerations required of the developer when generating SOAP-based web services.

Appendix A provides an example of the amount of code a user would typically have to write just to implement the "Hello World" example. Exemplary code 460 of FIG. 4E illustrates an implementation of the "Hello Word" example utilizing the present invention. A comparison of the code of Appendix A and the exemplary code 460 of FIG. 4E illustrates a contrast between the repetitive, error-prone code a developer would have to write without the present invention, and the simple code the developer can write using the invention. The user-implemented code of Appendix A is approximately 350 lines of code. The user would then have to duplicate much this code for each function for which exposure is desirable via SOAP. In contrast, code 460 comprises a mere 40 lines of code, and all of the details regarding the SOAP protocol, dispatching to the appropriate object and function, marshaling the XML, un-marshaling the XML, and generating the SOAP response are all hidden from the user. The term(s) marshaling or marshaling information as used herein refers to the code and/or data generated at compile time in connection with the generation of SOAP messages from programming language constructs, and the generation of programming language constructs from SOAP messages. The invention thus frees the developer to focus on the code to specify the description of the web service, and the code specific to their application.

Thus, using declarative syntax for specifying SOAP-based web services in accordance with the present invention dramatically simplifies the creation of SOAP-based web services, saving the user from having to write potentially thousands of lines of code.

In one embodiment of the present invention, attributes for Visual C++ are utilized for the declarative syntax of the present invention. Such use of attributes is, for example, described in commonly assigned copending U.S. patent application Ser. No. 09/169,383, filed Oct. 9, 1998, entitled "Extending Program Languages with Source-Program Attribute Tags." In accordance with the invention, the Visual C++ attributes used to specify a SOAP-based web service have access to type and marshaling information. Further, the use of embedded interface definition language (IDL) allows the attributes to leverage existing Visual C++ compiler technology and present a familiar programming model to component object model (COM) developers.

The invention is thus easy to use, so that a beginning web service developer is not intimidated by what would be an extremely complicated programming task if not for the invention.

While one of ordinary skill in the art is familiar with Visual C++ attributes and COM (particularly IDL), to summarize, attributes are 1) declarative instructions for guiding implementation, allowing the user to encapsulate domain-specific concepts in declarations and 2) hints to the compilation process i.e., they can perform in-place or multi-site code transformations. IDL provides a way to describe the interface of an object, including marshaling details. An "attribute provider" is a module that implements attributes by querying the compiler for information and calling into the compiler to inject new code and data. The compiler periodically informs the attribute provider of certain well-defined event points at which the provider can choose to query the compiler for state or information from which the provider may conditionally inject source code or more abstractly manipulate the parse tree. One of ordinary skill in the art is also familiar with XML and XML namespaces. Exemplary usages of the same are described below.

In accordance with the present invention, the user describes their web service interface using embedded IDL, that is, an IDL description embedded in a C++ header file or source file. All methods that are to be exposed as part of the web service must be introduced by an interface, otherwise the attribute provider emits a compile-time error since it cannot retrieve marshaling information without the IDL description.

Exemplary code 500 of FIG. 5 illustrates format for code that a user would potentially write in accordance with the declarative syntax of the present invention, where uuid is a UUID string, e.g. "643cd054-24b0-4f34-b4a1-642519836fe8", soapMethod1 or soapMethod2 is any valid C++ identifier, idl_attributes is some combination of the in, out, size_is and retval IDL attributes, type[1 . . . N] is any integral or user-defined C++ type, parameter[1 . . . N], header[1 . . . N] are any valid C++ identifiers and wsdlName1 or wsdlName2 can be any valid C++ identifier.

The in, out, size_is and retval IDL attributes are used in specifying a web service and they appear in the web service's interface declaration. The in IDL attribute applies to a parameter and marks the parameter as being provided by the caller of the method. The out IDL attribute applies to a parameter and marks the parameter as being sent back to the caller of the method. The out IDL attribute can be used in conjunction with the in IDL attribute. The size_is IDL attribute applies to a variable-size array parameter. The size_is IDL attribute references another parameter on the method that contains the size of the array to be marshaled. It applies only to out parameters. The retval IDL attribute applies to a parameter and marks the parameter as being the return value of the method call. The retval IDL attribute applies exclusively to out-only parameters.

In accordance with the present invention, the following new attributes are used in the implementation of a web service: soap_handler, soap_method and soap_header. These attributes appear in the web service's class declaration. Soap_handler applies to a class and marks the class as handling SOAP requests. There are parameters for specifying the name of the Web service and the XML namespace for the user-data that appears under the SOAP "Header" and "Body" elements. Soap_method applies to a method and marks the method as being exposed via SOAP. There is an optional parameter for specifying the exposed name of the method. The method's data will appear under the SOAP "Body" element. Soap_header applies to a method and marks the method as receiving and/or sending a specified class member variable as a SOAP header. There are optional parameters for specifying if it is an in header, an out header, and whether or not the header is required (see above for a description of "mustUnderstand" headers). The optional soap_header attribute can only be used on methods that also have the soap_method attribute. The "Hello World" example of code 460 from FIG. 4E exemplifies use of the soap_handler and soap_method attributes, but does not make use of the soap_header attribute. Other non-limiting examples are described below.

A First Example

Exemplary code 600 of FIG. 6 illustrates the implementation of a SOAP Method with integral types as parameters. In this case, "method1" has two parameters named "bInput" and "bOutput". In the class declaration, the optional "name" parameter of the "soap_method" attribute has been omitted. When omitted, the "name" defaults to the name of the method, which in this case is "method1." The optional "soap_header" attribute has also been omitted, an exemplary use of which is described below.

When processing code 600, the parser sees the object attribute which causes the subsequent_interface to be a COM interface. Embedded IDL is only allowed in COM interfaces which are characterized by being annotated with the "object", "dual" or "dispinterface" attributes.

Then, the parser sees the "method1" declaration "[id(1)] HRESULT method1([in] bool bInput, [out, retval] bool *bOutput);" and parses the "in" attribute for the "bInput" parameter and the "out" and "retval" parameters for the "bOutput" parameters. The attribute provider can then use this information to inject marshaling information i.e., information for creating SOAP messages, for "method1."

Then, the parser further sees the "soap_handler" attribute and calls into the attribute provider, which marks the class as handling SOAP requests, by injecting the CSoapHandler base class:

class CClass: public Interface,

/*Injected base class*/public CSoapHandler<CClass>

The attribute provider also injects declarations for functions that are used at runtime to process SOAP requests which may include the following:

```
const __soapmap ** GetFunctionMap( );
const __soapmap ** GetHeaderMap( );
void * GetHeaderValue( );
const wchar_t * GetNamespaceUri( );
const char * GetNamespaceUriA( );
const char * GetServiceName( );
HRESULT CallFunction(void *pvParam,
const wchar_t *wszLocalName,
int cchLocalName, size_t nItem);
```

When processing, the parser sees the "soap_method" attribute and calls into the attribute provider, which adds "method1" to the list of methods to be exposed via SOAP. When called back at the end of the class by the compiler, the attribute provider iterates over these methods and queries the compiler for a description of the method, including the parameter names, types, and their IDL attributes: ([in] Tbool; PbInput;[out,retval] Tbool;*PbOutput;)THRESULT;. The attribute provider parses this information and generates data that is used at runtime to process SOAP requests, as shown in cumulative in exemplary code 700, 705, 710, 715, 720 and 725 of FIGS. 7A through 7F.

In accordance with the present invention, the injected data contains information for marshaling the parameters of "method1", including names, types, which are in-parameters (SOAPFLAG_IN), which are out-parameters (SOAPFLAG_OUT), and which parameters are return values (SOAPFLAG_RETVAL). There is a one-to-one relation between the injected data and the embedded IDL description for "method1."

Finally, the attribute provider injects implementations for the member functions and implementation maps it declared for the "soap_handler" attribute, as shown in the exemplary code 800 beginning in FIG. 8A and continued and ending in FIG. 8B.

A Second Example

Exemplary code 900 of FIG. 9 illustrates the implementation of a SOAP Method with an integral type SOAP Header. Code 900 is similar to code 600 as in the first example, with the addition of the "Header1" member variable of CClass, and the "soap_header" attribute on "method1."

In this case, "method1" has two parameters named "bInput" and "bOutput". In the class declaration, the optional "name" parameter of the "soap_method" attribute has been omitted. When omitted, the "name" defaults to the name of the method which in this case is "method1." The optional soap_header attribute has been added.

When processing, the parser sees the object attribute which causes the subsequent_interface to be a COM interface. Embedded IDL is only allowed in COM interfaces which are characterized by being annotated with the "object", "dual" or "dispinterface" attributes. Then, the parser sees the "method1" declaration "[id(1)] HRESULT method1([in] bool bInput, [out, retval] bool *bOutput);" and parses the "in" attribute for the "bInput" parameter and the "out" and "retval" parameters for the "bOutput" parameters. The attribute provider will use this information to inject marshaling information for "method1."

The parser sees the "soap_handler" attribute and calls into the attribute provider, which marks the class as handling SOAP requests, by injecting the CSoapHandler base class:
  class CClass:public Interface,
  /*Injected base class*/public CSoapHandler<CClass>

The attribute provider also injects declarations for functions that are used at runtime to process SOAP requests which may include the following:

```
const __soapmap ** GetFunctionMap( );
const __soapmap ** GetHeaderMap( );
void * GetHeaderValue( );
const wchar_t * GetNamespaceUri( );
const char * GetNamespaceUriA( );
const char * GetServiceName( );
HRESULT CallFunction(void *pvParam,
const wchar_t *wszLocalName,
int cchLocalName, size_t nItem);
```

The parser sees the "soap_method" attribute and calls into the attribute provider, which adds "method1" to the list of methods to be exposed via SOAP. At the end of the class, the attribute provider iterates over these methods and queries the compiler for a description of the method, including the parameter names, types, and their IDL attributes: ([in] Tbool; PbInput;[out,retval] Tbool;*PbOutput;)THRESULT;.

The attribute provider parses this information and generates data that is used at runtime to process SOAP requests, as shown in cumulative in exemplary code 1000, 1005 and 1010 of FIGS. 10A through 10C.

As can be inferred from the code of FIGS. 10A through 10C, the injected data contains information for marshaling the parameters of "method1," including names, types, which are in-parameters (SOAPFLAG_IN), which are out-parameters (SOAPFLAG_OUT), and which parameters are return values (SOAPFLAG_RETVAL). There is a one-to-one relation between the injected data and the embedded IDL description for "method1."

The parser sees the "soap_header" attribute and calls into the attribute provider, which adds "Header1" to the list of headers to process for "method1". The attribute has its "in" parameter value set to true, which specifies that the method will expect an XML element named "Header1" in the SOAP request to appear under the SOAP "Header" element. When called back at the end of the class by the compiler, the attribute provider iterates over the headers for each method and queries the compiler for information about the header and injects marshaling data, as shown in cumulative in exemplary code 1015, 1020 and 1025 of FIGS. 10D through 10F.

The data is nearly identical to that injected for method parameters. As can be inferred from the code 1015, 1020 and 1025, the injected data includes information for marshaling "Header1" of the soap_method: its name, its memory offset into the class (offsetof(CClass, Header1)), its type (SOAPTYPE_INT) and that it is an "in" header (SOAPFLAG_IN). There is a one-to-one correspondence between the injected data and the "soap_header" declaration.

Finally, the attribute provider injects implementations for the member functions and implementation maps it declared for the "soap_handler" attribute, as shown in the exemplary code 1100 beginning in FIG. 11A and continued and ending in FIG. 11B.

A Third Example

Exemplary code 1200 of FIG. 12 illustrates the implementation of a SOAP Method with complex type parameters. This example illustrates how arrays and complex types e.g., structs, enums, etc., are processed. Code 1200 is similar to code 600 of the first example, with the parameters of method1 changed to an enum and a struct that has an array as a member.

The interaction between the compiler and the attribute provider is the same as for the first example, except for the description returned by the compiler when queried for information about "method1": ([in] LTestStruct;PtIn;[out,retval] ETestEnum; *PeOut;)THRESULT;. This description "LTestStruct" identifies the "tIn" parameter as type "TestStruct", which is a struct (the "L" prefix); and the parameter "eOut" parameter as type "TestEnum", which is an enum (the "E" prefix). When the attribute provider encounters these definitions while parsing the description, the attribute provider queries the compiler for information about TestStruct and TestEnum and generates data to marshal those types, as shown in cumulative in exemplary code 1300, 1305, 1310, 1315, 1320, 1325 and 1330 of FIGS. 13A through 13H.

As can be inferred from the code 1300, 1305, 1310, 1315, 1320, 1325 and 1330 by one of ordinary skill in the art, the injected data includes marshaling information for creating SOAP messages in connection with the TestStruct and TestEnum types i.e., the element names, types, and offsets into their parent type, and the injected data for the method contains a pointer to the data for TestStruct and TestEnum. The injected data also contains information about the "arr" array field of TestStruct, which is used to marshal the array e.g., the number of array dimensions and the size of each dimension. Additionally, just as method parameter types can be structs, enums and other user-defined types, struct fields types can be structs, enums and other user-defined types. All other injected code and data generated is the same as in the first example described above in connection with FIGS. 6 through 8B.

Exemplary Flow Diagrams Illustrating Exemplary Compile-Time Processing

Figure 14A:
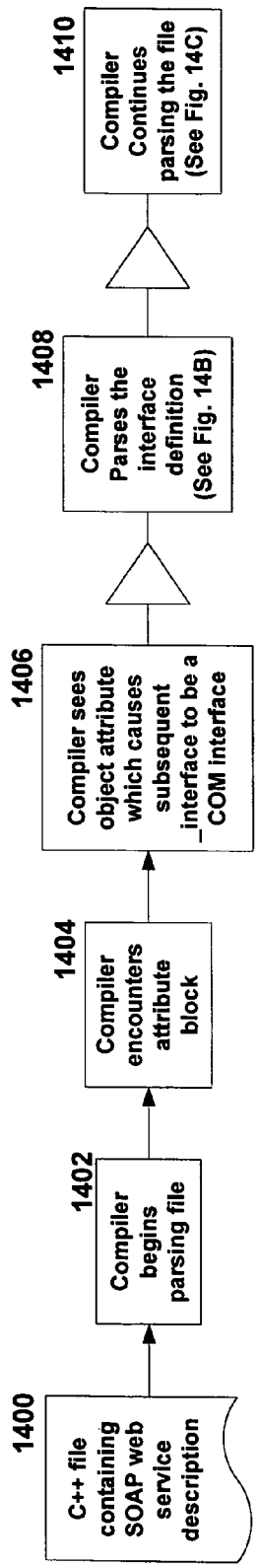
FIGS. 14A through 14F illustrate exemplary compile-time processing in accordance with the present invention of a C++ file containing declaratory syntax of the invention for a SOAP-based Web service.

FIGS. 14A through 14F illustrate exemplary processing of a C++ file containing the declaratory syntax of the invention for a SOAP-based Web service. In FIG. 14A, at 1400, a C++ file containing SOAP web service description is received by a compiler. At 1402, the compiler begins parsing the file. At 1404, the compiler encounters an attribute block having the declarative syntax of the invention. At 1406, the compiler recognizes uuid and object attributes, and allows the interface definition that follows to contain embedded IDL. At 1408, the compiler parses the interface definition as described in more detail in connection with FIG. 14B below. At 1410, the compiler continues parsing the file as described in more detail in connection with FIG. 14C below.

Figure 14B:
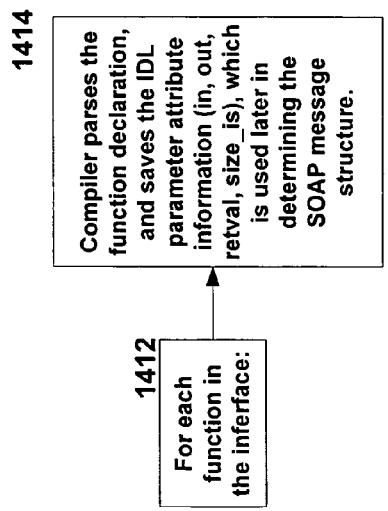

In FIG. 14B, at 1412, for each function in the interface, the compiler performs 1414. At 1414, the compiler parses the function declaration, and saves the IDL parameter attribute information e.g., in, out, retval, size_is, which is used later in determining SOAP message structure.

Figure 14C:
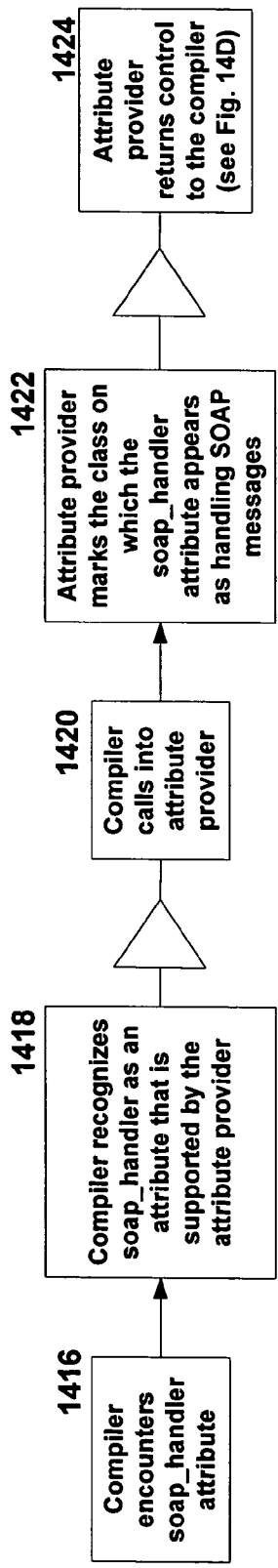

In FIG. 14C, at 1416, the compiler encounters a soap_handler attribute. At 1418, the compiler recognizes soap_handler as an attribute that is supported by the attribute provider, for example, as embodied in a dynamic link library file. At 1420, the compiler calls into the attribute provider. At 1422, the attribute provider marks the class on which the soap_handler attribute appears as handling SOAP messages. At 1424, the attribute provider returns control to the compiler.

Figure 14D:
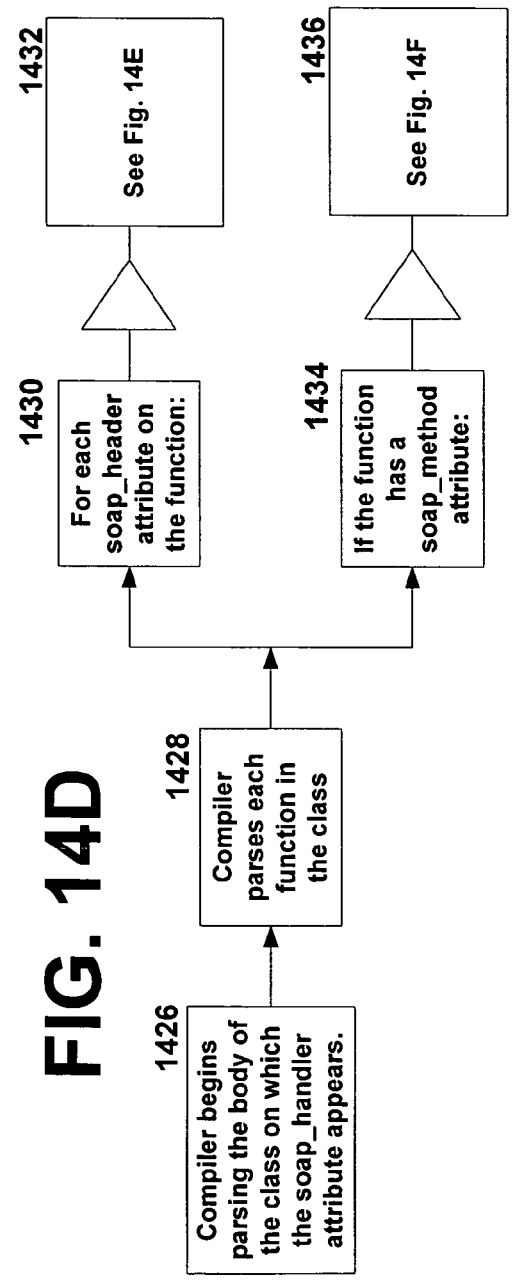

FIG. 14D illustrates exemplary processing by the compiler at 1424. At 1426, the compiler begins parsing the body of the class on which the soap_handler attribute appears. At 1428, the compiler parses each function in the class. At 1430, for each soap_header attribute on the function, the compiler performs processing at 1432 as described in more detail in connection with FIG. 14E. At 1434, if the function has a soap_method attribute, the compiler performs processing at 1436 as described in more detail in connection with FIG. 14F.

Figure 14E:
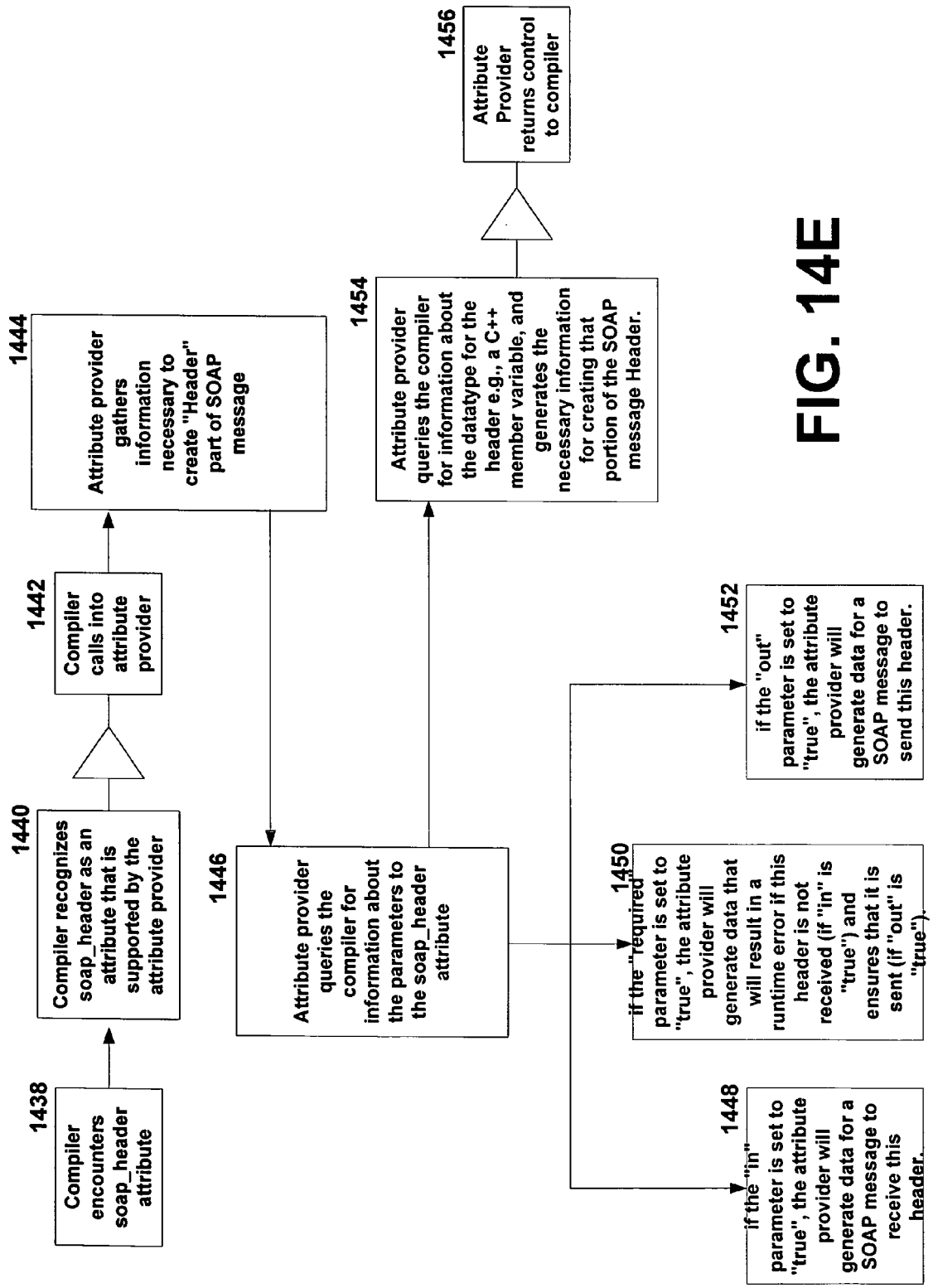

FIG. 14E describes exemplary processing for each soap_header attribute on the function. At 1438, the compiler encounters a soap_header attribute. At 1440, the compiler recognizes soap_header as an attribute that is supported by the attribute provider. At 1442, the compiler calls into the attribute provider. At 1444, the attribute provider gathers information necessary to create the "Header" part of a SOAP message. At 1446, the attribute provider queries the compiler for information about the parameters to the soap_header attribute. At 1448, if the "in" parameter is set to true, the attribute provider generates data for a SOAP message to receive this header. At 1450, if the "required" parameter is set to true, the attribute provider generates data that results in a runtime error if this header is not received e.g., if "in" is true, and ensures that it is sent, e.g., if "out" is true. At 1452, if the "out" parameter is set to true, the attribute provider generates data for a SOAP message to send this header. At 1454, the attribute provider queries the compiler for information about the data type for the header e.g., a C++ member variable, and generates the information for creating that portion of the SOAP message Header. At 1456, the attribute provider returns control to compiler.

Figure 14F:
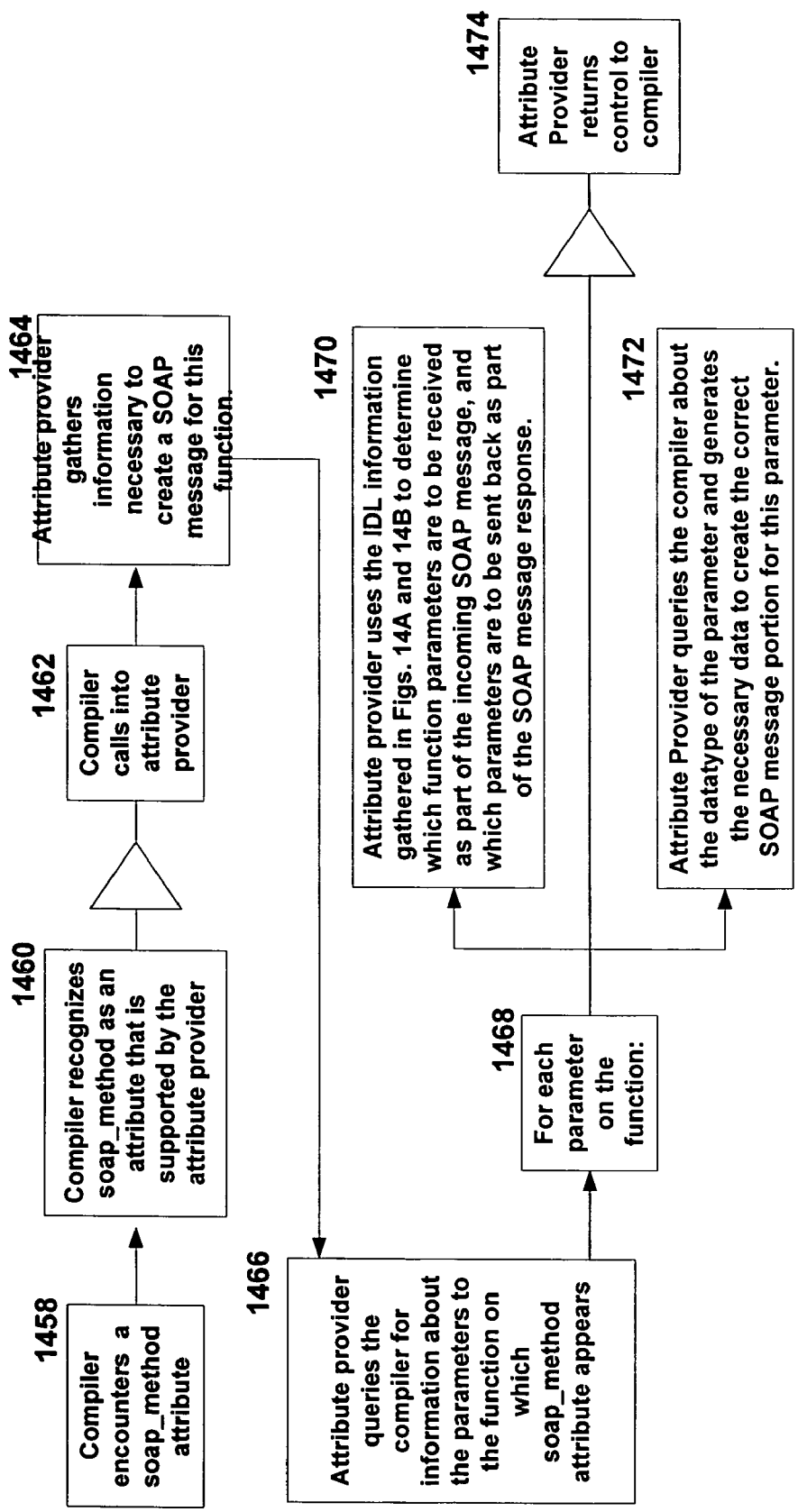

FIG. 14F describes exemplary processing if the function has a soap_method attribute. At 1458, the compiler encounters a soap_method attribute. At 1460, the compiler recognizes soap_method as an attribute that is supported by the attribute provider. At 1462, the compiler calls into the attribute provider. At 1464, the attribute provider gathers information to create a SOAP message for this function. At 1466, the attribute provider queries the compiler for information about the parameters to the function on which soap_method attribute appears. At 1468, for each parameter on the function, (i) at 1470, the attribute provider uses the IDL information gathered in FIGS. 14A and 14B to determine which function parameters are to be received as part of the incoming SOAP message, and which parameters are to be sent back as part of the SOAP message response and (ii) at 1472, the attribute provider queries the compiler about the data type of the parameter and generates the data to create the correct SOAP message portion for this parameter. At 1474, the attribute provider returns control to compiler.

As can be seen from the volumes of code generated in the above-described first, second and third examples and exemplary processing of the attributes of the invention by an attribute provider, the SOAP attributes of the present invention save the user from writing potentially thousands of lines of code, while providing a simple, familiar programming model that makes it easy for anyone to create a SOAP-based web service even if they are completely unfamiliar with the underlying details of SOAP. Additionally, the solution of the present invention is a compile-time solution and thus does not waste valuable computing resources at run-time.

Exemplary Flow Diagrams Illustrating Exemplary Run-Time Processing

Figure 15A:
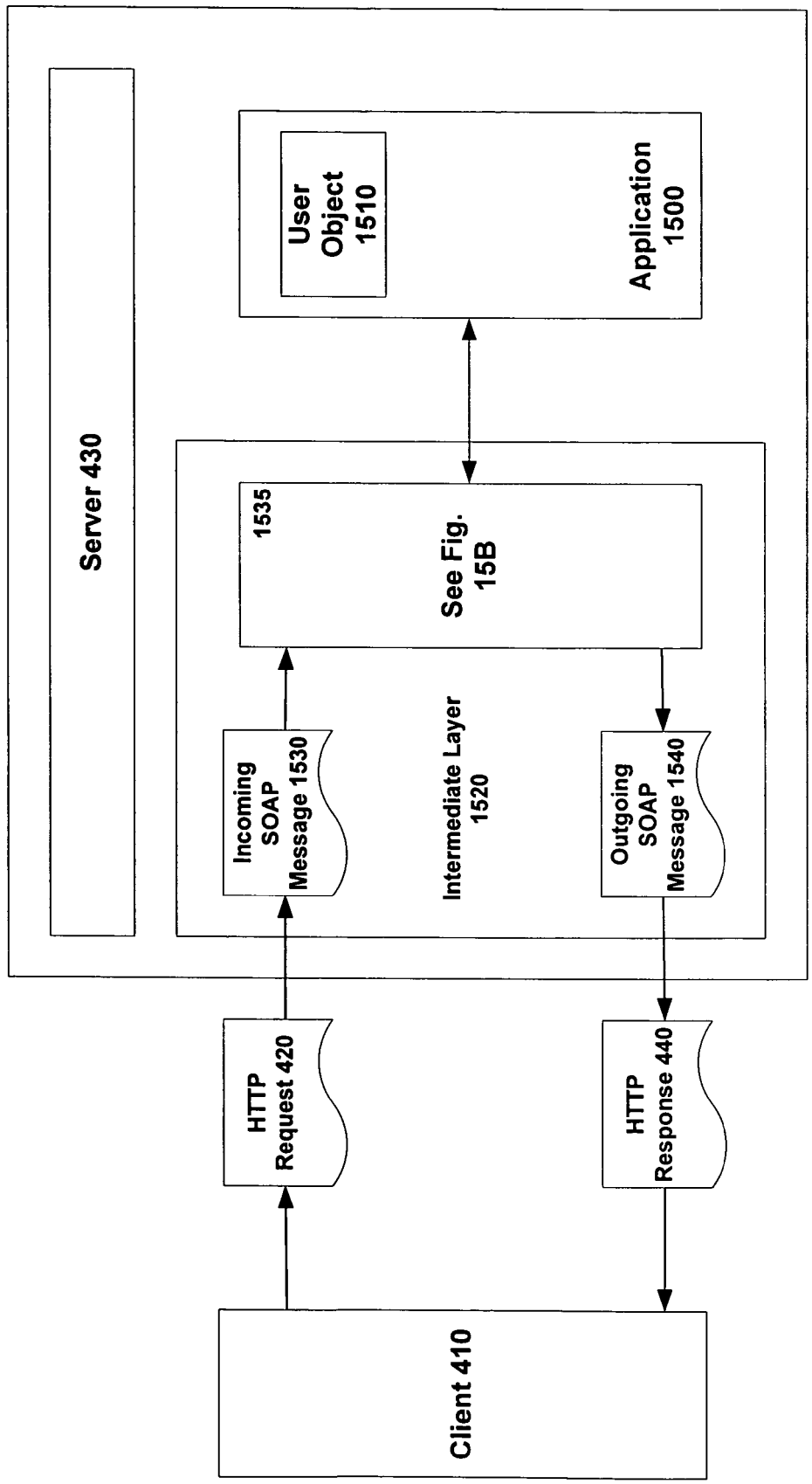
FIGS. 15A and 15B illustrate exemplary run-time processing of incoming or outgoing SOAP messages in accordance with the present invention.
Figure 15B:
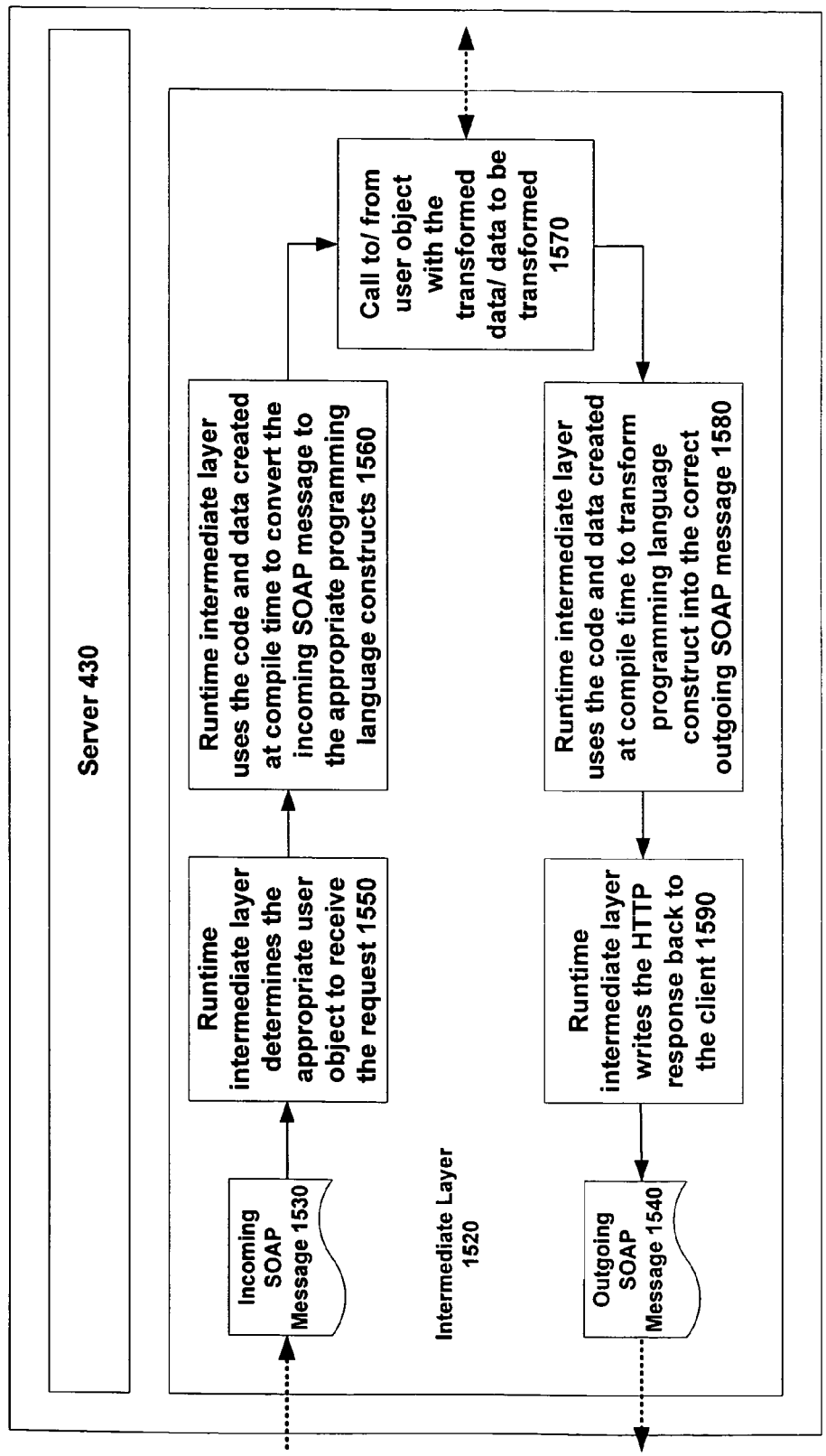

FIGS. 15A and 15B illustrate exemplary run-time processing of incoming or outgoing SOAP messages in accordance with the present invention. In contrast to FIG. 4B, an intermediate layer 1520 is between a user object 1510 of a server application 1500 and a request 420 or a response 440. Intermediate layer 1520 intercepts incoming SOAP messages 1530 and handles outgoing SOAP messages 1540, and serves to communicate appropriately with user object 1510. The code and data generated at compile-time in accordance with the present invention is utilized when run-time processing. Since the code and data for generating, sending, receiving and converting SOAP messages has already been generated at compile-time, valuable time and computing resources are saved at run-time.

FIG. 15B illustrates the processing of block 1535 in exemplary non-limiting detail. In connection with an incoming SOAP message 1530, at 1550, the runtime intermediate layer 1520 determines the appropriate user object 1510 to receive the request. At 1560, the runtime intermediate layer 1560 uses the code and data created at compile-time to convert the incoming SOAP message to the appropriate programming language constructs, such as C++ constructs. At 1570, an appropriate call is made to the appropriate user object 1510 with the transformed data 1570. For outgoing SOAP messages 1540, at 1570, the user object 1510 has sent a call containing a programming language construct to be transformed into an appropriate SOAP message. At 1580, the runtime intermediate layer 1520 uses the code and data generated at compile-time to convert the programming language construct into a correctly formatted outgoing SOAP message. At 1590, the runtime intermediate layer 1520 writes the HTTP response for delivery to client 410.

While exemplary implementations of the present invention make use of particular names that expose the functionality of the present invention, e.g., soap_handler attribute, soap_header attribute, soap_method attribute etc., these names are not to be considered limiting, and the practice of the present invention is not to be limited thereto. Therefore, where particular claims refer to a particular name, the names are merely references to concepts that are functionally shown and described in the detailed specification and drawings.

As mentioned above, while exemplary embodiments of the present invention have been described in connection with the C++ programming language, the underlying concepts may be applied to any programming language for which it would be desirable to have declarative information for SOAP-based communications. Thus, the present invention may be implemented with any programming language, such as Fortran, Pascal, Visual Basic, C, C#, Java, etc. While exemplary method and other software component names are utilized herein for distinguishing and identifying purposes, any name would be suitable and the invention does not lie in the particular design nomenclature utilized. Additionally, while SOAP messages are typically transported via HTTP, the present invention applies to any transport protocol for transporting XML messages.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs utilizing the declarative capabilities of the present invention are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to include the declarative syntax for SOAP-based communications of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of the C++ programming language and HTTP transport protocol, one skilled in the art will recognize that the present invention is not limited thereto, and that the methods of programming in a distributed or networked programming environment, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

APPENDIX A

For the following code, the developer is without use of the declarative syntax of the present invention, and so the developer is required to implement the SOAP-based communications, thereby greatly increasing the length and complexity of the code. The following code corresponds to the "Hello World" example of FIGS. 4A through 4E and thus the following code may be directly contrasted in terms of length and complexity with the code 460 of FIG. 4E, written in accordance with the present invention.

```
// Created by Microsoft (R) C/C++ Compiler Version 13.00.9160
//
// c:\dev\ patent2.mrg.cpp
// compiler-generated file created 03/11/01 at 18:35:58
//
// This C++ source file is intended to be a representation of the
// source code injected by the compiler. It may not compile or
// run exactly as the original source file.
//
//+++ Start Injected Code
[no_injected_text(true)];        // Suppress injected text, it has already been injected
#pragma warning(disable: 4543) // Suppress warnings about skipping injected text
#pragma warning(disable: 4199) // Suppress warnings from attribute providers
#pragma message("\n\nNOTE: This merged source file should be visually inspected for
correctness.\n\n")
//--- End Injected Code
#define _WIN32_WINNT 0x0500
#define _ATL_ATTRIBUTES
#include <atlsoap.h>
[ module(name="HelloWorld") ];
//+++ Start Injected Code For Attribute 'module'
#injected_line 6 "c:\\dev\\ patent2.cpp"
#ifndef GUID_DEFINED
#define GUID_DEFINED
typedef struct _GUID
{
    unsigned long Data1;
    unsigned short Data2;
    unsigned short Data3;
    unsigned char Data4[ 8 ];
}
GUID;
#endif
extern "C" const _declspec(selectany) GUID _LIBID_ =
{0x66053382,0x2973,0x3d34, {0x98,0x4e,0xf5,0xd4,0xe1,0x4a,0xc2,0xb0} };
struct _declspec(uuid("66053382-2973-3d34-984e-f5d4e14ac2b0")) HelloWorld;
//--- End Injected Code For Attribute 'module'
//+++ Start Injected Code For Attribute 'module'
#injected_line 6 "c:\\dev\\ patent2.cpp"
class CHelloWorldModule;
//--- End Injected Code For Attribute 'module'
//+++ Start Injected Code For Attribute 'module'
#injected_line 6 "c:\\dev\\ patent2.cpp"
extern CHelloWorldModule _AtlModule;
//--- End Injected Code For Attribute 'module'
//+++ Start Injected Code For Attribute 'module'
#injected_line 6 "c:\\dev\\ patent2.cpp"
extern "C" STDAPI DllGetClassObject(REFCLSID rclsid, REFIID riid, void** ppv);
//--- End Injected Code For Attribute 'module'
//+++ Start Injected Code For Attribute 'module'
#injected_line 6 "c:\\dev\\ patent2.cpp"
extern "C" STDAPI DllRegisterServer(void);
//--- End Injected Code For Attribute 'module'
//+++ Start Injected Code For Attribute 'module'
#injected_line 6 "c:\\dev\\ patent2.cpp"
extern "C" STDAPI DllUnregisterServer(void);
//--- End Injected Code For Attribute 'module'
//+++ Start Injected Code For Attribute 'module'
#injected_line 6 "c:\\dev\\ patent2.cpp"
extern "C" STDAPI DllCanUnloadNow(void);
//--- End Injected Code For Attribute 'module'
//+++ Start Injected Code For Attribute 'module'
#injected_line 6 "c:\\dev\\ patent2.cpp"
BOOL WINAPI DllMain(HINSTANCE hInstance, DWORD dwReason, LPVOID lpReserved);
//--- End Injected Code For Attribute 'module'
//+++ Start Injected Code For Attribute 'module'
#injected_line 6 "c:\\dev\\ patent2.cpp"
class CHelloWorldModule : public CAtlDllModuleT<CHelloWorldModule>
{
public:
    DECLARE_LIBID(_uuidof(HelloWorld))
};
#injected _line 6 "c:\\dev\\ patent2.cpp"
CHelloWorldModule _AtlModule;
#injected _line 6 "c:\\dev\\ patent2.cpp"
extern "C" STDAPI DllGetClassObject(REFCLSID rclsid, REFIID riid, void** ppv)
{
    return _AtlModule.DllGetClassObject(rclsid, riid, ppv);
}
```

```
#injected_line 6 "c:\\dev\\ patent2.cpp"
extern "C" STDAPI DllRegisterServer(void)
{
    return __AtlModule.DllRegisterServer( );
}
#injected_line 6 "c:\\dev\\ patent2.cpp"
extern "C" STDAPI DllUnregisterServer(void)
{
    return __AtlModule.DllUnregisterServer( );
}
#injected_line 6 "c:\\dev\\ patent2.cpp"
extern "C" STDAPI DllCanUnloadNow(void)
{
    return __AtlModule.DllCanUnloadNow( );
}
#injected_line 6 "c:\\dev\\ patent2.cpp"
BOOL WINAPI DllMain(HINSTANCE hInstance, DWORD dwReason, LPVOID lpReserved)
{
    hInstance;
    return __AtlModule.DllMain(dwReason, lpReserved);
}
#injected_line 6 "c:\\dev\\ patent2.cpp"
#if defined(_M_IX86)
#pragma comment(linker, "/EXPORT:DllMain=_DllMain@12,PRIVATE")
#pragma comment(linker, "/EXPORT:DllRegisterServer=_DllRegisterServer@0,PRIVATE")
#pragma comment(linker,
"/EXPORT:DllUnregisterServer=_DllUnregisterServer@0,PRIVATE")
#pragma comment(linker, "/EXPORT:DllGetClassObject=_DllGetClassObject@12,PRIVATE")
#pragma comment(linker, "/EXPORT:DllCanUnloadNow=_DllCanUnloadNow@0,PRIVATE")
#elif defined(_M_IA64)
#pragma comment(linker, "/EXPORT:DllMain,PRIVATE")
#pragma comment(linker, "/EXPORT:DllRegisterServer,PRIVATE")
#pragma comment(linker, "/EXPORT:DllUnregisterServer,PRIVATE")
#pragma comment(linker, "/EXPORT:DllGetClassObject,PRIVATE")
#pragma comment(linker, "/EXPORT:DllCanUnloadNow,PRIVATE")
#endif
//--- End Injected Code For Attribute 'module'
[ uuid("643cd054-24b0-4f34-b4a1-642519836ef9"), object ]
__interface IHello World
{
        [id(1)] HRESULT Hello World(
            [in] BSTR inputString,
            [out, retval] BSTR *retval);
};
[
        request_handler(
            name="Default",
            sdl="sdl"),
        soap_handler(
            name="HelloWorld",
            namespace="http://atlserver/soap/HelloWorld",
            protocol="soap")
]
class CHelloWorld : public IHelloWorld
,
    /*+++ Added Baseclass */ public CSoapHandler<CHelloWorld>
{
public:
        [ soap_method ]
        HRESULT HelloWorld(
            BSTR inputString,
            BSTR *retval)
        {
                CComBSTR bstrRet(L"Hello ");
                bstrRet += inputString;
                *retval = bstrRet.Detach( );
                return S_OK;
        }
        //+++ Start Injected Code For Attribute 'soap_handler'
#injected_line 21 "c:\\dev\\ patent2.cpp"
        const __soapmap ** GetFunctionMap( );
        const __soapmap ** GetHeaderMap( );
        void * GetHeaderValue( );
        const wchar_t * GetNamespaceUri( );
        const char * GetNamespaceUriA( );
        const char * GetServiceName( );
        HRESULT CallFunction(void *pvParam, const wchar_t *wszLocalName, int cchLocalName,
size_t nItem);
        //--- End Injected Code For Attribute 'soap_handler'
```

```
};
//+++ Start Injected Code For Attribute 'request_handler'
#injected_line 17 "c:\\dev\\ patent2.cpp"
HANDLER_ENTRY_SDL("Default", CHelloWorld, ::CHelloWorld, sdl)
//--- End Injected Code For Attribute 'request_handler'
//+++ Start Injected Code For Attribute 'soap_handler'
#injected_line 21 "c:\\dev\\ patent2.cpp"
struct __CHelloWorld_HelloWorld_struct
    {
    BSTR inputString;
    BSTR retval;
};
extern __declspec(selectany) const __soapmapentry __CHelloWorld_HelloWorld_entries[ ] =
    {
        {
            0x1151616E,
            "retval",
            L"retval",
            sizeof("retval")-1,
            SOAPTYPE_STRING,
            SOAPFLAG_RETVAL | SOAPFLAG_OUT,
            offsetof(__CHelloWorld_HelloWorld_struct, retval),
            NULL,
            NULL,
            -1,
        },
        {
            0x0B8B8DA7,
            "inputString",
            L"inputString",
            sizeof("inputString")-1,
            SOAPTYPE_STRING,
            SOAPFLAG_NONE | SOAPFLAG_IN,
            offsetof(__CHelloWorld_HelloWorld_struct, inputString),
            NULL,
            NULL,
            -1,
        },
        { 0x00000000 }
    };
extern __declspec(selectany) const __soapmap __CHelloWorld_HelloWorld_map =
    {
        0x46BA99FC,
        "HelloWorld",
        L"HelloWorld",
        sizeof("HelloWorld")-1,
        sizeof("HelloWorld")-1,
        SOAPMAP_FUNC,
        __CHelloWorld_HelloWorld_entries,
        sizeof(__CHelloWorld_HelloWorld_struct),
        1,
        0
    };
extern __declspec(selectany) const __soapmapentry
__CHelloWorld_HelloWorld_atlsoapheader_entries[ ] =
    {
        { 0x00000000 }
    };
extern __declspec(selectany) const __soapmap __CHelloWorld_HelloWorld_atlsoapheader_map
=
    {
        0x46BA99FC,
        "HelloWorld",
        L"HelloWorld",
        sizeof("HelloWorld")-1,
        sizeof("HelloWorld")-1,
        SOAPMAP_HEADER,
        __CHelloWorld_HelloWorld_atlsoapheader_entries,
        0,
        0,
        -1
    };
extern __declspec(selectany) const __soapmap * __CHelloWorld_funcs[ ] =
    {
            &__CHelloWorld_HelloWorld_map,
            NULL
    };
extern __declspec(selectany) const __soapmap * __CHelloWorld_headers[ ] =
    {
```

```
                    &__CHelloWorld__HelloWorld__atlsoapheader__map,
                    NULL
        };
ATL__NOINLINE inline const __soapmap ** CHelloWorld::GetFunctionMap( )
        {
            return __CHelloWorld__funcs;
        };
ATL__NOINLINE inline const __soapmap ** CHelloWorld::GetHeaderMap( )
        {
            return __CHelloWorld__headers;
        }
ATL__NOINLINE inline void * CHelloWorld::GetHeaderValue( )
        {
            return this;
        }
ATL__NOINLINE inline HRESULT CHelloWorld::CallFunction(
                void *pvParam,
                const wchar__t *wszLocalName,
                int cchLocalName,
                size__t nItem)
        {
        wszLocalName;
        cchLocalName;
        HRESULT hr = S__OK;
        switch(nItem)
                {
        case 0:
            {
                __CHelloWorld__HelloWorld__struct *p = (__CHelloWorld__HelloWorld__struct *)
pvParam;
                hr = HelloWorld(p->inputString, &p->retval);
                break;
            }
        default:
            hr = E__FAIL;
        }
        return hr;
}
ATL__NOINLINE inline const wchar__t * CHelloWorld::GetNamespaceUri( )
        {
            return L"http://atlserver/soap/HelloWorld";
        }
ATL__NOINLINE inline const char * CHelloWorld::GetNamespaceUriA( )
        {
            return "http://atlserver/soap/HelloWorld";
        }
ATL__NOINLINE inline const char * CHelloWorld::GetServiceName( )
        {
            return "HelloWorld";
        }
}
//--- End Injected Code For Attribute 'soap__handler'
```

What is claimed is:

1. A method for implementing (Simple Object Access Protocol) SOAP-based Web services via a programming language in a computing system, comprising:

in connection with code that implements at least one SOAP-based Web service, identifying at least one (Simple Object Access Protocol) SOAP message attribute supported by an attribute provider, wherein the (Simple Object Access Protocol) SOAP message attribute is a (Simple Object Access Protocol) SOAP handling mechanism;

declaring the (Simple Object Access Protocol) SOAP handling mechanism corresponding to the at least one SOAP-based Web service via a construct of said programming language, when compiling said code, communication with the attribute provider is performed, wherein the attribute provider queries a compiler for information about the (Simple Object Access Protocol) SOAP handling mechanism;

generating at least one of additional code and data from the information for use at run-time when at least one of sending and receiving a (Simple Object Access Protocol) SOAP message for said at least one SOAP-based Web service occurs.

2. A method according to claim 1, wherein said declaring includes declaring at least one SOAP handling mechanism corresponding to at least one SOAP-based Web service via a C++ construct.

3. A method according to claim 2, wherein said declaring includes declaring at least one C++ attribute corresponding to at least one SOAP-based Web service.

4. A method according to claim 1, wherein when sending a SOAP message for said at least one SOAP-based Web service, the method further includes utilizing said at least one of additional code and data at run-time to generate the SOAP message.

5. A method according to claim 1, wherein when receiving a SOAP message for said at least one SOAP-based Web service, the method further includes utilizing said at least one of additional code and data at run-time to convert said SOAP message to an object of the programming language.

6. A method according to claim 1, wherein said declaring reduces the amount of code a developer writes relative to writing the code without said declaring.

7. A method according to claim 1, wherein said declaring includes describing at least one Web service interface using embedded interface definition language (IDL).

8. A method according to claim 1, wherein said provider object communicates with the compiler of said code to generate said at least one of additional code and data.

9. A method according to claim 1, wherein via said declaring, said method hides from the developer the underlying details regarding the SOAP protocol, dispatching to the appropriate object and function, marshaling the (eXtensible Markup Language) XML, un-marshaling the XML, and generating the SOAP response.

10. A method according to claim 1, wherein said provider object is an attribute provider object and said attribute provider object has access to attribute type and marshaling information.

11. A method according to claim 1, wherein for each method of said code that is to be exposed as part of the at least one SOAP-based Web service, the method is introduced via an interface as part of an interface definition language (IDL) description.

12. A method according to claim 11, wherein said declaring further includes specifying at least one of in, out, size is and retval IDL attributes in the at least one SOAP-based Web service's interface declaration.

13. A method according to claim 1, wherein said declaring includes declaring at least one of a soap_handler attribute, a soap_method attribute and a soap_header attribute.

14. A computer readable medium bearing computer executable instructions for carrying out the method of claim 1.

15. A method of compiling programming language code with a compiler, comprising:
  initially parsing the code;
  during said initial parsing, encountering an attribute block having a (Simple Object Access Protocol) SOAP message attribute supported by an attribute provider, wherein the (Simple Object Access Protocol) SOAP message attribute is a (Simple Object Access Protocol) SOAP handling mechanism and the attribute block has a declarative syntax for the (Simple Object Access Protocol) SOAP handling mechanism via a construct of the programming language code;
  calling into the attribute provider, wherein the attribute provider gathers information about the SOAP message attribute based on queries to the compiler;
  identifying the (Simple Object Access Protocol) SOAP message attribute and allowing an interface definition that follows the attribute block to include embedded information;
parsing the interface definition for each function in a class on which the (Simple Object Access Protocol) SOAP message attribute appears;
  correlating the information returned from the attribute provider to at least one of a (Simple Object Access Protocol) SOAP header message attribute and a (Simple Object Access Protocol) SOAP method message attribute; and
  generating a portion of the (Simple Object Access Protocol) SOAP message that corresponds to the correlated SOAP message attribute and the information gathered by the attribute provider.

16. A method according to claim 15, wherein for each function in the interface definition, the compiler parses the function declaration, and saves the parameter attribute information for use later in determining a (Simple Object Access Protocol) SOAP message structure.

17. A computer readable medium bearing computer executable instructions for carrying out the method of claim 15.

18. A method processing (Simple Object Access Protocol) SOAP messages at run-time in a computing system having a server with at least one application having at least one user object implementing at least one SOAP-based Web service, comprising:
  in connection with the user object that implements the at least one SOAP-based Web service, identifying at least one (Simple Object Access Protocol) SOAP message attribute supported by an attribute provider, wherein the at least one (Simple Object Access Protocol) SOAP message attribute is a (Simple Object Access Protocol) SOAP handling mechanism;
  at least one of receiving an incoming SOAP message from a client computing device and receiving a call from a user object with at least one programming language construct; and
  with a runtime intermediate layer, at least one of converting said incoming SOAP message to a corresponding programming language construct and converting said call with at least one programming language construct to an outgoing SOAP message,
  wherein said runtime intermediate layer utilizes at least one of code and data generated when at least one of sending and receiving a (Simple Object Access Protocol) SOAP message for said at least one SOAP-based Web service during compilation of said user object, and
  wherein the code and data are generated from information about the (Simple Object Access Protocol) SOAP handling mechanism returned to the attribute provider upon a query from the attribute provider for the information.

19. A method according to claim 18, wherein said converting of said incoming SOAP message to the corresponding programming language construct includes determining the appropriate user object to receive the SOAP message.

20. A computer readable medium bearing computer executable instructions for carrying out the method of claim 18.

* * * * *